United States Patent
Filiz et al.

(10) Patent No.: US 9,542,028 B2
(45) Date of Patent: Jan. 10, 2017

(54) TEMPERATURE COMPENSATING TRANSPARENT FORCE SENSOR HAVING A COMPLIANT LAYER

(71) Applicant: Apple Inc., Cupertino, CA (US)

(72) Inventors: Sinan Filiz, Cupertino, CA (US); James E. Pedder, Cupertino, CA (US); Charley T. Ogata, Cupertino, CA (US); John Stephen Smith, Cupertino, CA (US); Dhaval Chandrakant Patel, Cupertino, CA (US); Shin John Choi, Cupertino, CA (US); Brian Q. Huppi, Cupertino, CA (US); Christopher J. Butler, Cupertino, CA (US); Martin P. Grunthaner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/972,917

(22) Filed: Dec. 17, 2015

(65) Prior Publication Data

US 2016/0103545 A1    Apr. 14, 2016

Related U.S. Application Data

(63) Continuation of application No. 14/729,508, filed on Jun. 3, 2015, which is a continuation of application No. 14/594,835, filed on Jan. 12, 2015, now abandoned.
(Continued)

(51) Int. Cl.
*G06F 3/041* (2006.01)
*G06F 3/044* (2006.01)
(Continued)

(52) U.S. Cl.
CPC ............. *G06F 3/0414* (2013.01); *G01L 1/005* (2013.01); *G01L 1/16* (2013.01); *G01L 1/18* (2013.01);
(Continued)

(58) Field of Classification Search
CPC ...... G06F 3/0414; G06F 3/0416; G06F 3/045; G06F 2203/04105; G01L 1/16
See application file for complete search history.

(56) References Cited

U.S. PATENT DOCUMENTS 7,511,702 B2    3/2009  Hotelling
8,305,358 B2    11/2012 Klinghult et al.
(Continued)

FOREIGN PATENT DOCUMENTS

CN    1796955      7/2006
CN    101071354    11/2007
(Continued)

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — Ryan A Lubit
(74) *Attorney, Agent, or Firm* — Brownstein Hyatt Farber Schreck, LLP

(57) ABSTRACT

An optically transparent force sensor that may compensate for environmental effects, including, for example, variations in temperature of the device or the surroundings. In some examples, two force-sensitive layers are separated by a compliant layer. The relative electrical response of the two force-sensitive layers may be used to compute an estimate of the force of a touch that reduces the effect of variations in
(Continued)

temperature. In some examples, piezoelectric films having anisotropic strain properties are used to reduce the effects of temperature.

13 Claims, 15 Drawing Sheets

Related U.S. Application Data

(60) Provisional application No. 61/926,905, filed on Jan. 13, 2014, provisional application No. 61/937,465, filed on Feb. 7, 2014, provisional application No. 61/939,257, filed on Feb. 12, 2014, provisional application No. 61/942,021, filed on Feb. 19, 2014, provisional application No. 62/024,566, filed on Jul. 15, 2014.

(51) Int. Cl.
*G06F 3/045* (2006.01)
*G01L 1/18* (2006.01)
*G01L 1/20* (2006.01)
*G01L 1/16* (2006.01)
*G01L 1/00* (2006.01)

(52) U.S. Cl.
CPC ............... *G01L 1/20* (2013.01); *G01L 1/205* (2013.01); *G06F 3/044* (2013.01); *G06F 3/045* (2013.01); *G06F 3/0412* (2013.01); *G06F 3/0416* (2013.01); *G06F 2203/04103* (2013.01); *G06F 2203/04105* (2013.01)

(56) References Cited

U.S. PATENT DOCUMENTS

| | | | |
|---|---|---|---|
| 8,780,074 B2 | 7/2014 | Castillo et al. | |
| 9,024,910 B2 | 5/2015 | Stephanou et al. | |
| 9,030,427 B2 | 5/2015 | Yasumatsu | |
| 9,063,599 B2 | 6/2015 | Yanagi et al. | |
| 2011/0259111 A1* | 10/2011 | Ohsato | G01L 1/26 73/766 |
| 2012/0200789 A1* | 8/2012 | Molne | G06F 3/0414 349/12 |
| 2012/0293491 A1 | 11/2012 | Wang et al. | |
| 2013/0057499 A1* | 3/2013 | Ando | G06F 3/038 345/173 |
| 2013/0082970 A1* | 4/2013 | Frey | G06F 3/0414 345/173 |
| 2014/0092336 A1* | 4/2014 | Watanabe | G02F 1/1336 349/58 |
| 2016/0048266 A1* | 2/2016 | Smith | G06F 3/0418 345/174 |
| 2016/0147352 A1 | 5/2016 | Filiz et al. | |

FOREIGN PATENT DOCUMENTS

| | | |
|---|---|---|
| CN | 101950224 | 1/2011 |
| CN | 102012772 | 4/2011 |
| CN | 103026327 | 4/2013 |
| EP | 0467562 | 1/1992 |
| EP | 2629075 | 8/2013 |
| JP | 2010197066 | 9/2010 |
| WO | WO 02/35461 | 5/2002 |
| WO | WO 2011/0156447 | 12/2011 |
| WO | WO 2013/177322 | 11/2013 |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

Rausch, "Printed piezoresistive strain sensors for monitoring of light-weight structures," Sensor+Test Conferences 2011—Sensor Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, 1 page.

\* cited by examiner

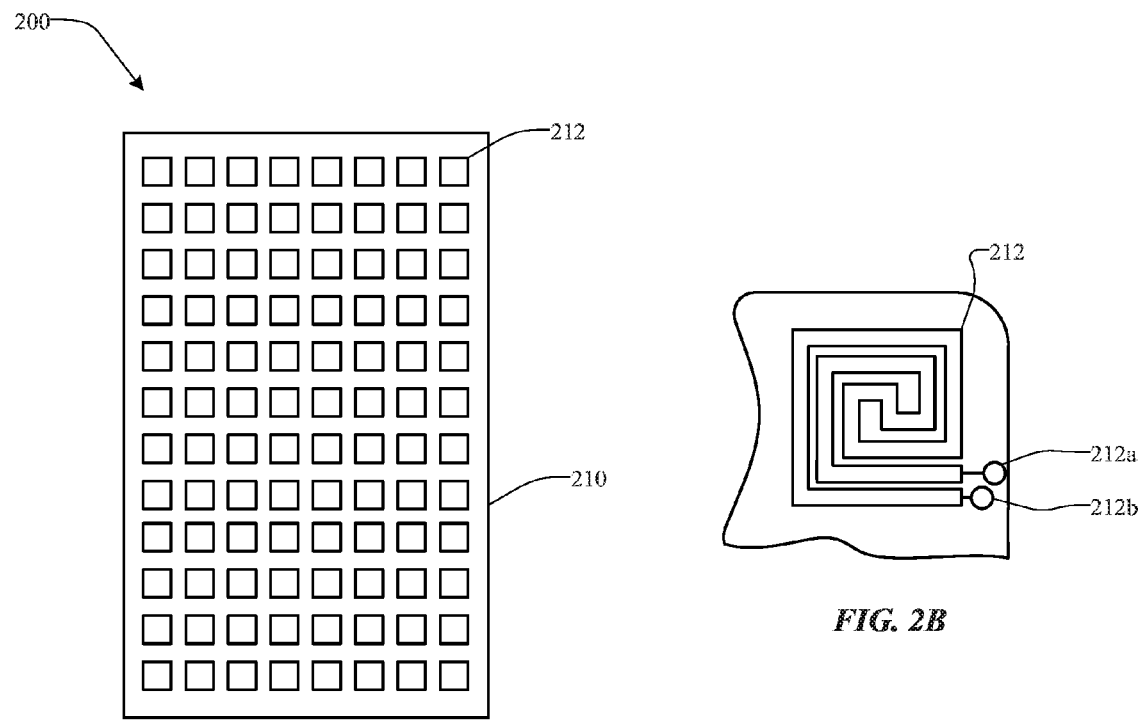
*FIG. 2A*
*FIG. 2B*
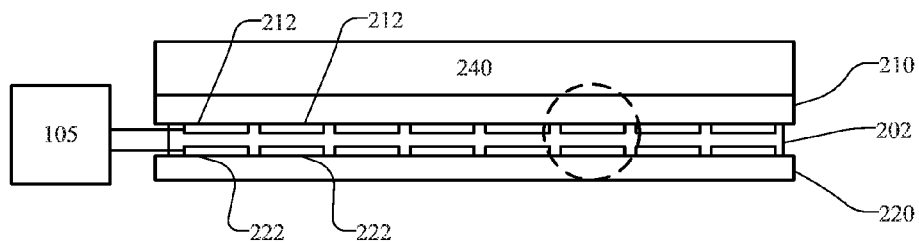
*FIG. 2C*

TEMPERATURE COMPENSATING TRANSPARENT FORCE SENSOR HAVING A COMPLIANT LAYER

CROSS-REFERENCE TO RELATED APPLICATIONS

This application is a continuation of U.S. patent application Ser. No. 14/729,508, filed Jun. 3, 2015, and entitled "Temperature Compensating Transparent Force Sensor Having A Compliant Layer," which is a continuation of U.S. patent application Ser. No. 14/594,835, filed Jan. 12, 2015, and entitled "Temperature Compensating Transparent Force Sensor Having A Compliant Layer," now abandoned, which claims priority to U.S. Provisional Patent Application No. 61/926,905, filed Jan. 13, 2014, and titled "Force Sensor Using a Transparent Force-Sensitive Film," U.S. Provisional Patent Application No. 61/937,465, filed Feb. 7, 2014, and titled "Temperature Compensating Transparent Force Sensor," U.S. Provisional Patent Application No. 61/939,257, filed Feb. 12, 2014, and titled "Temperature Compensating Transparent Force Sensor," U.S. Provisional Patent Application No. 61/942,021, filed Feb. 19, 2014, and titled "Multi-Layer Temperature Compensating Transparent Force Sensor," and U.S. Provisional Patent Application No. 62/024,566, filed Jul. 15, 2014, and titled "Strain-Based Transparent Force Sensor," the disclosure of each of which is incorporated by reference in its entirety.

TECHNICAL FIELD

Embodiments described herein generally relate to force sensing and, more particularly, to a temperature compensating force sensor having two or more transparent force-sensitive components separated by a compliant layer.

BACKGROUND

Many electronic devices include some type of user input device, including, for example, buttons, slides, scroll wheels, and similar devices or user-input elements. Some devices may include a touch sensor that is integrated or incorporated with a display screen. The touch sensor may allow a user to interact directly with user-interface elements that are presented on the display screen. However, some traditional touch sensors may only provide a location of a touch on the device. Other than location of the touch, many traditional touch sensors produce an output that is binary in nature. That is, the touch is present or it is not.

In some cases, it may be advantageous to detect and measure the force of a touch that is applied to a surface to provide non-binary touch input. However, there may be several challenges associated with implementing a force sensor in an electronic device. For example, temperature fluctuations in the device or environment may introduce an unacceptable amount of variability in the force measurements. Additionally, if the force sensor is incorporated with a display or transparent medium, it may be challenging to achieve both sensing performance and optical performance in a compact form factor.

SUMMARY

Embodiments described herein may relate to, include, or take the form of an optically transparent force sensor, which may be used as input to an electronic device. The optically transparent force sensor may be configured to compensate for variations in temperature using two or more force-sensitive layers that are disposed on opposite sides of a compliant layer. In some embodiments, anisotropic piezoelectric materials are used to compensate for variations in temperature.

In one example embodiment. an electronic device includes an optically transparent force sensor having a first transparent substrate and a first force-sensitive layer disposed relative to the first transparent substrate. The sensor may also include a second transparent substrate disposed below the first substrate and a second force-sensitive layer disposed relative to the second transparent substrate. A compliant layer may be disposed between the first and second substrates. The sensor may also include sensor circuitry that is configured to compare a relative electrical response between the first force-sensitive layer and the second force-sensitive layer to compute a temperature-compensated force estimate. In some cases, the temperature-compensated force estimate compensates for variations in temperature of the device.

In some embodiments, the first transparent substrate is configured to deflect in response to the force of a touch and the compliant layer deforms to reduce any tension or compression of the second transparent substrate. In some cases, the first transparent substrate experiences a first amount of tension that is greater than the second transparent substrate which experiences a reduced, second amount of tension. In some cases, the first transparent substrate deflects to a greater degree than the second transparent substrate in response to the force of a touch.

In some embodiments, the first force-sensitive layer is placed in tension in response to the force of a touch and the second force-sensitive layer is placed in compression in response to the force of a touch. In some embodiments, the compliant layer conducts heat between the first force-sensitive layer and the second force-sensitive layer to achieve a substantially uniform temperature distribution. In some embodiments, the first and second force-sensitive components are made from materials having substantially identical temperature coefficients of resistance. In some embodiments, the compliant layer comprises an optically clear adhesive. In some embodiments, the compliant layer is formed from of a material having a shear modulus less than one tenth of the shear modulus of the first transparent substrate.

In some embodiments, the first force-sensitive layer is formed from a first array of rectilinear force-sensitive components, and the second force-sensitive layer is formed from a second array of rectilinear force-sensitive components.

One example embodiment is directed to an electronic device having an optically transparent force sensor. The force sensor may include a cover (or force-receiving layer) and a first transparent substrate disposed below the cover (or force-receiving layer). A first array of force-sensitive components may be disposed relative to the first transparent substrate. A second transparent substrate may be disposed below the first substrate and a second array of force-sensitive components may be disposed relative to the second transparent substrate. A compliant layer may be disposed between the first and second substrates. The sensor may also include sensor circuitry that is configured to compare a relative electrical response between structures of the first array of force-sensitive components and the second array of force-sensitive components to compute a temperature-compensated force estimate. In some cases, a display element is disposed below the second transparent substrate.

In some embodiments, the first array of force-sensitive components includes a subset of edge force-sensitive components positioned along an edge of the first array. The edge force-sensitive components may be formed from traces that are oriented along a direction that is substantially perpendicular to the edge. In some embodiments, first array of force-sensitive components includes a subset of corner force-sensitive components positioned at corners of the first array. The corner force-sensitive components may be formed from traces that are oriented along a diagonal direction.

Some example embodiments are directed to an electronic device having an optically transparent force sensor including a first transparent substrate, a first force-sensitive layer disposed relative to the first transparent substrate, a second transparent substrate disposed below the first substrate and a second force-sensitive layer disposed relative to the second transparent substrate. The sensor may also include sensor circuitry that is configured to detect a voltage between the first force-sensitive layer and the second force-sensitive layer to compute a temperature-compensated force estimate. In some embodiments, the first force-sensitive layer is formed from an anisotropic piezoelectric film, and the second force-sensitive layer is formed from an isotropic piezoelectric film.

In some embodiments, the sensor also includes a third force-sensitive layer disposed relative to the second force-sensitive layer; and a fourth force-sensitive layer disposed relative to the third force-sensitive layer. The third force-sensitive layer may be formed from an isotropic piezoelectric film, and the fourth force-sensitive layer may be formed from an anisotropic piezoelectric film. In some embodiments, the sensor also includes a third transparent substrate disposed between the second force-sensitive layer and the third force-sensitive layer. In some cases, the first force-sensitive layer has an increased sensitivity to strain along a first direction, and the fourth force-sensitive layer has an increased sensitivity to strain along a second direction. The first direction may be substantially perpendicular to the second direction.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

FIG. 2A depicts a top view of an example force-sensitive structure including a grid of optically transparent force-sensitive components.

FIG. 2B depicts a top detailed view of an optically transparent serpentine force-sensitive component which may be used in the example force-sensitive structure depicted in FIG. 2A.

FIG. 2C depicts a side view of a portion of an example force-sensitive structure of a device taken along section A-A of FIG. 1

The use of the same or similar reference numerals in different figures indicates similar, related, or identical items.

DETAILED DESCRIPTION

Figure 1:
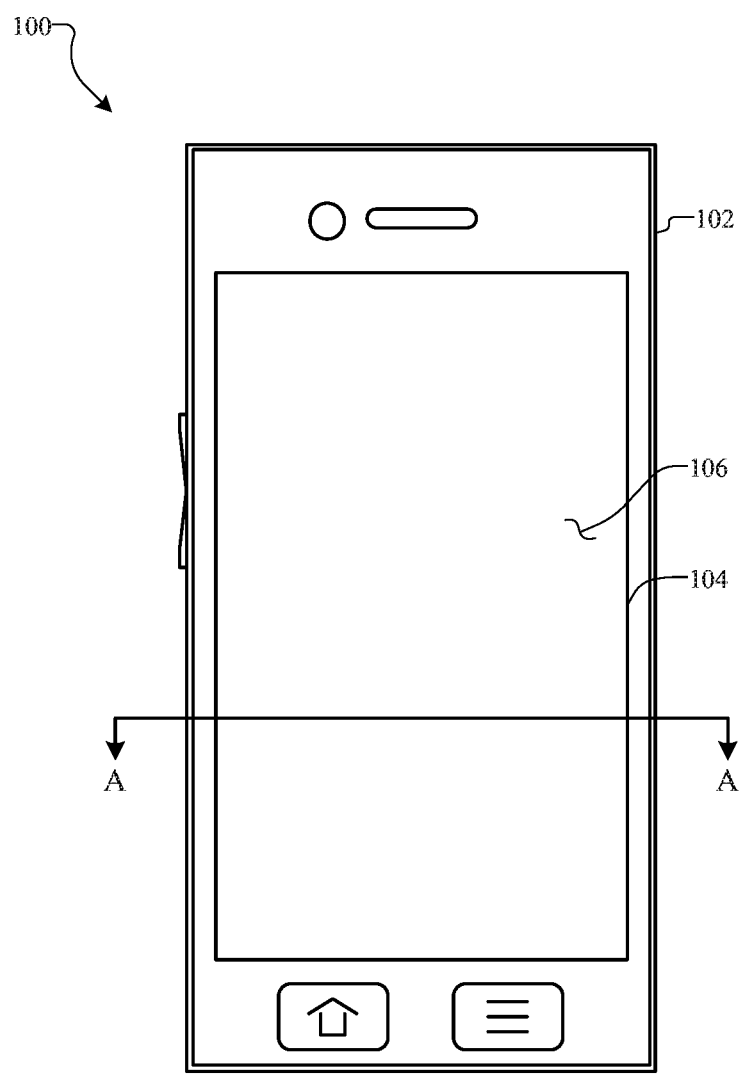
FIG. 1 depicts an example electronic device.

Embodiments described herein may relate to or take the form of a force sensor that is incorporated with components of an electronic device to form a touch-sensitive surface on the device. Some embodiments are directed to a force sensor that can compensate for variations in temperature and may be optically transparent for integration with a display or transparent medium of an electronic device. Certain embodiments described herein also relate to force-sensitive structures including one or more force-sensitive components for detecting a magnitude of a force applied to a device. In one example, a transparent force-sensitive component is integrated with, or adjacent to, a display element of an electronic device. The electronic device may be, for example, a mobile phone, a tablet computing device, a computer display, a notebook computing device, a desktop computing device, a computing input device (such as a touch pad, keyboard, or mouse), a wearable device, a health monitor device, a sports accessory device, and so on.

Generally and broadly, a user touch event may be sensed on a display, enclosure, or other surface associated with an electronic device using a force sensor adapted to determine the magnitude of force of the touch event. The determined magnitude of force may be used as an input signal, input data, or other input information to the electronic device. In one example, a high force input event may be interpreted differently from a low force input event. For example, a smart phone may unlock a display screen with a high force input event and may pause audio output for a low force input event. The device's responses or outputs may thus differ in response to the two inputs, even though they occur at the same point and may use the same input device. In further examples, a change in force may be interpreted as an additional type of input event. For example, a user may hold a wearable device force sensor proximate to an artery in order to evaluate blood pressure or heart rate. One may appreciate that a force sensor may be used for collecting a variety of user inputs.

In many examples, a force sensor may be incorporated into a touch-sensitive electronic device and located proximate to a display of the device, or incorporated into a display stack. Accordingly, in some embodiments, the force sensor may be constructed of optically transparent materials. For example, an optically transparent force sensor may include at least a force-receiving layer, a first and second substrate each including at least an optically transparent material, and each substrate including, respectively, a first and second force-sensitive component. In many examples, the first substrate may be disposed below the force-receiving layer such that the first force-sensitive component may experience deflection, tension, compression, or another mechanical deformation upon application of force to the force-receiving layer. In this manner, a bottom surface of the first substrate may experience an expansion, and a top surface of the first substrate may experience a compression. In other words, the first substrate may bend about its neutral axis, experiencing compressive and tensile forces.

A transparent force-sensitive component may be formed from a compliant material that exhibits at least one measurable electrical response that varies with a deformation, deflection, or shearing of the component. The transparent force-sensitive component may be formed from a piezoelectric, piezoresistive, resistive, or other strain-sensitive material that is attached to or formed on a substrate and electrically or operatively coupled to sensor circuitry for measuring a change in the electrical response of the material. Potential substrate materials include, for example, glass or transparent polymers like polyethylene terephthalate (PET) or cyclo-olefin polymer (COP). Example transparent conductive materials include polyethyleneioxythiophene (PEDOT), indium tin oxide (ITO), carbon nanotubes, graphene, piezoresistive semiconductor materials, piezoresistive metal materials, silver nanowire, other metallic nanowires, and the like. Transparent materials may be used in sensors that are integrated or incorporated with a display or other visual element of a device. If transparency is not required, then other component materials may be used, including, for example, Constantan and Karma alloys for the conductive component and a polyimide may be used as a substrate. Nontransparent applications include force sensing on track pads or behind display elements. In general, transparent and non-transparent force-sensitive components may be referred to herein as "force-sensitive components" or simply "components."

Transparent force-sensitive components can be formed by coating a substrate with a transparent conductive material, attaching a transparent conductive material, or otherwise depositing such a material on the substrate. In some embodiments, the force-sensitive components may be formed relative to the bottom surface of a first substrate and relative to a top surface of a second substrate. The force-sensitive components of the first and second substrates may be oriented to face one another. In some implementations, the first substrate may deflect in response to a user touch. The deflection of the first substrate may cause the bottom surface of the first substrate to expand under tension, which may cause the transparent force-sensitive component (disposed relative to the bottom surface) to also expand, stretch, or otherwise geometrically change as a result of the deflection.

In some cases, the force-sensitive component may be placed under tension in response to a downward deflection because the component is positioned below the neutral axis of the bend of the substrate. Once under tension, the transparent force-sensitive component may exhibit a change in at least one electrical property, for example, resistance. In one example, the resistance of the transparent force-sensitive component may increase linearly with an increase in tension experienced by the component. In another example, the resistance of the transparent force-sensitive component may decrease linearly with an increase in tension experienced by the component. One may appreciate that different transparent materials may experience different changes to different electrical properties, and as such, the effects of tension may vary from embodiment to embodiment.

In some embodiments, the force-sensitive components may be formed from a piezoresistive or resistive material. In some implementations, when the piezoresistive or resistive material is strained, the resistance of the component changes as a function of the strain. The change in resistance can be measured using a sensing circuit that is configured to measure small changes in resistance of the force-sensitive components. In some cases, the sensing circuit may include a bridge circuit configuration that is configured to measure the differential change in resistance between two or more force-sensitive components. If the relationship between electrical resistance, temperature and mechanical strain of the component material is known, the change in the differential strain $\epsilon_x - \epsilon_y$ may be derived. In some cases, the differential strain may account for changes strain or resistance due to changes in temperature, which may cancel if the two elements have similar thermal properties and are at similar temperature while being subjected to differential strain due to the strain relief layer. In this way, a transparent piezoresistive or resistive component can be used as a temperature compensating force sensor.

In certain embodiments, a resistive element may be measured by using a voltage divider or bridge circuit. For example, a voltage $V_g$ may be measured across the output of two parallel voltage dividers connected to a voltage supply $V_s$. One of the voltage dividers may include two resistors of known resistance $R_1$ and $R_2$, the other voltage divider may include a first resistive strain element $R_x$ and a second resistive strain element $R_y$. A voltage can be measured between a node between $R_1$ and $R_2$ and a node between $R_x$ and $R_y$ to detect small changes in the relative resistance between the two strain elements. In some cases, additional sensor circuitry (including a processing unit) may be used to calculate the mechanical strain due to a force on the surface based on the relative resistance between two strain elements. In some cases, the sensor circuitry may estimate the mechanical strain while reducing or eliminating environmental effects, such as variations in temperature.

In some embodiments, pairs of voltage dividers may be used to form a full bridge, so as to compare the output of a plurality of sensors. In this manner, error present as a result of temperature differences between sensors may be substantially reduced or eliminated without requiring dedicated error correction circuitry or specialized processing software. In some embodiments, an electrical response due to the force of a touch may be measured and an algorithm may be used to compare a relative response and cancel the effects of the temperature changes. In some embodiments, both differential measurements of the components and measurements of their individual responses may be made to extract the corresponding differential strain, and also the temperature. In some cases an algorithm may use the differential and individual responses to compute a force estimate that cancels the effects on strain due to, for example, the differences in the thermal coefficient of expansion of the two component materials.

In some embodiments, the force-sensitive component is patterned into an array of lines, pixels, or other geometric elements herein referred to as "component elements." The regions of the force-sensitive component or the component elements may also be connected to sense circuitry using electrically conductive traces or electrodes. In some cases, the conductive traces or electrodes are also formed from transparent conductive materials. In some embodiments, sense circuitry, may be in electrical communication with the one or more component elements via the electrically conductive traces and/or the electrodes. As previously mentioned, the sense circuitry may be adapted to detect and measure the change in the electrical property or response (e.g., resistance) of the component due to the force applied.

In some cases, the force-sensitive components may be patterned into pixel elements, each pixel element including an array of traces generally oriented along one direction. This configuration may be referred to as a piezoresistive or resistive strain gauge configuration. In general, in this configuration the force-sensitive-component may be composed of a material whose resistance changes in a known fashion in response to strain. For example, some materials may exhibit a change in resistance linearly in response to strain. Some materials may exhibit a change in resistance logarithmically or exponentially in response to strain. Some materials may exhibit a change in resistance in a different manner. For example, the change in resistance may be due to a change in the geometry resulting from the applied strain such as an increase in length combined with decrease in cross-sectional area may occur in accordance with Poisson's effect. The change in resistance may also be due to a change in the inherent resistivity of the material due to the applied strain.

In some embodiments, the orientation of the strain-sensitive elements may vary from one part of the array to another. For example, elements in the corners may have traces that are oriented to be sensitive to strain at 45 degrees with respect to a row (or column) of the array. Similarly, elements along the edge of the array may include traces that are most sensitive to strain perpendicular to the edge or boundary. In some cases, elements may include one of a variety of serpentine trace configurations that may be configured to be sensitive to a combination of the strains along multiple axes. The orientation of the traces in the strain-sensitive elements may have different angles, depending on the embodiment.

The pixel elements may have trace patterns that are configured to blend the sensitivity to strain along multiple axes to detect changes in boundary conditions of the sensor or damage to the device. For example, if an element, component, or substrate becomes less constrained because of damage to the physical edge of a device, the sensitivity of the response to strain in the X direction may become higher, while the sensitivity of the response to strain in the Y direction may be lower. However, if the pixel element is configured to be responsive to both X and Y directions, the combined response of the two or more directions (which may be a linear combination or otherwise) may facilitate use of the sensor, even after experiencing damage or changes in the boundary conditions of the substrate.

In some embodiments, the force-sensitive component may be formed from a solid sheet of material and may be placed in electrical communication with a pattern of electrodes disposed on one or more surfaces of the force-sensitive component. The electrodes may be used, for example, to electrically couple a region of the solid sheet of material to sense circuitry. An electrode configuration may be used to measure a charge response when strained. In some cases, the force-sensitive component may generate different amounts of charge depending on the degree of the strain. The overall total charge may reflect a superposition of the charge generated due to strain along various axes.

In some embodiments, the force-sensitive component may be integrated with, or placed adjacent to, portions of a display element, herein generally referred to as a "display stack" or simply a "stack." A force-sensitive component may be integrated with a display stack, by, for example, being attached to a substrate or sheet that is attached to the display stack. In this manner, as the display stack bends in response to an applied force, and through all the layers which have good strain transmission below the neutral axis, a tensile strain is transmitted.

Alternatively, the force-sensitive component may be placed within the display stack in certain embodiments. Although certain examples are herein provided with respect to a force-sensitive component integrated with a display stack, in other embodiments, the force-sensitive component may be integrated in a portion of the device other than the display stack.

In some embodiments, one or more force-sensitive components may be integrated with or attached to a display element of a device, which may include other types of sensors. In some embodiments, a display element may include a touch sensor included to detect the location of one or more user touch events. Using a touch sensor in combination with the transparent force-sensitive component in accordance with some embodiments described herein, the location and magnitude of a touch on a display element of a device can be estimated.

In some embodiments, the device may include both touch-sensitive elements and force-sensitive elements relative to a surface that may cooperate to improve accuracy of the force sensors. In some cases, the information from the touch-sensitive elements may be used in combination with stored information about the responsiveness of the surface to reconstruct the force exerted on the surface. For example, the location determined by the touch sensor may be used in conjunction with a set of weighting coefficients stored in a memory to estimate the force applied at the corresponding points. A different touch location may be used in conjunction with a different set of coefficients weighting the response of the strain sensors to predict a force of touch at that point. In certain examples, the algorithm used to calculate the forces at the surface may be based, at least in part, upon the information provided by the touch sensor, stored information from calibration of the display, or information collected and stored during the operational life of the sensors. In some cases, the sensors may be calibrated to zero force during a time preceding a touch indication from the touch sensors.

One challenge associated with using a force-sensitive component or film within a display stack is that the given electrical property (for example, resistance) may change in response to temperature variations as the electronic device is transported from place to place, or used by a user. For example, each time a user touches the touch screen, the user may locally increase the temperature of the screen and force-sensitive component. In other examples, different environments (e.g., indoors or outdoors) may subject the electronic device to different ambient temperatures. In still further examples, an increase in temperature may occur as a result of heat produced by electronic components or systems of the device.

In some cases, the force-sensitive component may also expand and contract in response to changes in other environmental conditions, such as changes in humidity or barometric pressure. In the following examples, the electrical property is a resistance and the variable environmental condition is temperature. However, the techniques and methods described herein may also be applied to different electrical properties, such as capacitance or inductance, which may be affected by changes in other environmental conditions.

In some implementations, a change in temperature or other environmental conditions, either locally or globally, may result in expansion or contraction of the force-sensitive component, electronic device enclosure, and/or other components adjacent to the component which in turn may change the electrical property (e.g., resistance) measured by the sense circuitry. In many cases, the changes in the electrical property due to temperature change may obfuscate any changes in the electrical property as a result of an input force. For example, a deflection may produce a reduction or increase in the resistance or impedance of the force-sensitive component. A change in temperature may also produce a reduction or increase in the resistance or impedance of the force-sensitive component. As a result, the two effects may cancel each other out or, alternatively, may amplify each other resulting in an insensitive or hypersensitive force sensor. A similar reduction or increase in the resistance or impedance of the force-sensitive component could also be produced by, for example, an increase in temperature of the force-sensitive component due to heat produced by other elements of the device.

In some cases, mechanical changes due to variations in temperature may also impact the electrical performance of the sensor. In particular, variations in temperature of the force-sensing component may result in variations in strain on the force-sensing components. For example, a heated force-sensitive component may expand and a cooled force-sensitive component may contract producing a strain on the component. This strain may cause a change in resistance, impedance, current, or voltage that may be measured by associated sense circuitry and may impact the performance of the force sensor.

One solution is to account for environmental effects by providing more than one force-sensing component that is subjected to the same or substantially the same environmental conditions. A first force-sensing component may serve as a reference point or environmental baseline while measuring the strain of a second force-sensing component. In some implementations, both of the force-sensitive components may be constructed of substantially identical materials such that the reference component reacts to the environment in the same manner as the component being measured. For example, in some cases, each of the two components may be adapted to have identical or nearly identical thermal coefficients of expansion. In this manner, the mechanical and geometric changes resulting from temperature changes may be measured as a difference between the components. In some implementations, because each sensor has the same or similar thermal coefficient of expansion, each sensor may expand or contract in a substantially identical manner. Using appropriate sensor circuitry and/or sensor processing, effects on the electrical properties of either sensor as a result of temperature can be substantially compensated, cancelled, reduced or eliminated.

In some embodiments, a first sensor (having one or more force-sensing components) may be positioned or disposed below a surface which receives an input force. Positioned below the first sensor may be a compliant layer formed from a thermally conductive material. Positioned below the compliant layer may be a second sensor (having one or more force-sensing components) which may function as a reference sensor. In some embodiments, the thermal conductivity of the compliant layer result in a substantially uniform temperature between the first and second sensor. The compliant layer may also distribute or otherwise absorb a substantial portion of the deflection of the first sensor such that the second sensor may be deflected or deformed to a much lower degree. In some cases, the second sensor may experience substantially reduced tensile forces and, in some implementations, may not experience any substantial tensile force at all.

In some embodiments, a compliant layer may be used to reduce the transmission of strain through a stack such that layers below the compliant layer experience reduced strain but still deflect to some extent. In some cases, sensor components below the compliant layer and attached to the top surface of a substrate may be subjected to compressive forces due to the (reduced) deflection. Such compressive forces may have the opposite effect of the tensile strain in the layer(s) above the compliant layer. In some cases, a strain-based electrical property of a lower sensor component may be opposite in sign from that of an upper sensor component disposed on an opposite side of the compliant layer and a lower surface of a respective substrate. A similar effect may be achieved by placing the upper sensor components on an upper surface of a (first) respective substrate and the lower sensor components on a lower surface of a (second) respective substrate. When the signals from the two sensors are compared, the temperature signal may appear as a common mode change, and the strain may appear as a differential change. Thus, the relative measurement may be used to compensate for variations in temperature.

FIG. 1 depicts an example electronic device 100. The electronic device 100 may include a display 104 disposed or positioned within an enclosure 102. The display 104 may include a stack of multiple elements including, for example, a display element, a touch sensor layer, a force sensor layer, and other elements. The display 104 may include a liquid-crystal display (LCD) element, organic light emitting diode (OLED) element, electroluminescent display (ELD), and the like. The display 104 may also include other layers for improving the structural or optical performance of the display, including, for example, glass sheets, polymer sheets, polarizer sheets, color masks, and the like. The display 104 may also be integrated or incorporated with a cover 106, which forms part of the exterior surface of the device 100. Example display stacks depicting some example layer elements are described in more detail below with respect to FIGS. 2-5.

In some embodiments, a touch sensor and or a force sensor are integrated or incorporated with the display 104. In some embodiments, the touch and/or force sensor enable a touch-sensitive surface on the device 100. In the present example, a touch and/or force sensor are used to form a touch-sensitive surface over at least a portion of the exterior surface of the cover 106. The touch sensor may include, for example, a capacitive touch sensor, a resistive touch sensor, or other device that is configured to detect the occurrence and/or location of a touch on the cover 106. The force sensor may include a strain-based force sensor similar to the force sensors described herein.

In some embodiments, each of the layers of the display 104 may be adhered together with an optically transparent adhesive. In other embodiments, each of the layers of the display 104 may be attached or deposited onto separate substrates that may be laminated or bonded to each other. The display 104 may also include other layers for improving the structural or optical performance of the display, including, for example, glass sheets, polarizer sheets, color masks, and the like.

FIG. 2A depicts a top view of an example force-sensitive structure 200 including a grid of optically transparent force-sensitive components. The force-sensitive structure 200 may be integrated or incorporated with a display of an electronic device, such as the example described above with respect to FIG. 1. As shown in FIG. 2A, the force-sensitive structure 200 includes a substrate 210 having disposed upon it a plurality of individual force-sensitive components 212. In this example, the substrate 210 may be an optically transparent material, such as polyethylene terephthalate (PET), glass, sapphire, diamond, and the like. The force-sensing components 212 may be made from transparent conductive materials including, for example, polyethyleneioxythiophene (PEDOT), indium tin oxide (no), carbon nanotubes, gallium zinc oxide, indium gallium zinc oxide, graphene, piezoresistive semiconductor material, piezoresistive metal material, nickel nanowires, platinum nanowires, silver nanowire, other metallic nanowires, and the like. In certain embodiments, the force-sensing components 212 may be selected at least in part on temperature characteristics. For example, the material selected for the force-sensing components 212 may have a negative temperature coefficient of resistance such that, as temperature increases, the resistance of the material decreases.

As shown in FIG. 2A, the force-sensing components 212 may be formed as an array of rectilinear pixel elements, although other shapes and array patterns could also be used. In many examples, each individual force-sensing component 212 may have a shape and/or pattern that depends on the location of the force-sensing component 212 within the array. For example, in some embodiments, the force-sensing component 212 may be formed as a serpentine pattern of traces, such as shown in FIG. 2B. The force-sensing component 212 may include at least two electrodes 212a, 212b for connecting to a sensing circuit. In other cases, the force-sensing component 212 may be electrically connected to sense circuitry without the use of electrodes. For example, the force-sensing component 212 may be connected to the sensing circuitry using conductive traces that are formed as part of the component layer.

FIG. 2C depicts a side view of a portion of the example force-sensitive structure 200 taken along section A-A of FIG. 1. As depicted in this cross section, a first substrate 210 may be disposed below a force-receiving layer 240. The force-receiving layer 240 may correspond to the cover 106 depicted in FIG. 1. In some cases, force-receiving layer 240 is configured to receive a force directly from the user, and in some cases, the force-receiving layer 240 is configured to receive a force via another layer or component of the stack that is disposed relative to a surface of the force-receiving layer 240. In some embodiments, the force-receiving layer 240 may be made from a material having high strain transmission properties. For example, the force-receiving layer 240 may be made from a hard or otherwise rigid material such as glass, plastic, or metal such that an exerted force may be effectively transmitted through the force-receiving layer 240 to the layers disposed below.

As shown in FIG. 2C, a compliant layer 202 may be disposed below the force-receiving layer 240 and the first substrate 210 having an array of individual force-sensitive components 212. The compliant layer 202 may be formed from a compliant material that is configured to compress and/or relieve strain in response to the force of a touch. For example, the compliant layer 202 may be configured to relieve shear and/or strain between the first substrate 210 and the second substrate 220. In some embodiments, the compliant layer 202 may be formed from a low-durometer elastomer. In one non-limiting example, the elastomer may have a durometer less than 25 Shore A. In some embodiments, the compliant layer 202 has a modulus of elasticity that is less than one-quarter of the modulus of elasticity of the first substrate 210. In some embodiments, the compliant layer 202 has a modulus of elasticity that is less than one-fifth of the modulus of elasticity of the first substrate 210. In some embodiments, the compliant layer 202 has a modulus of elasticity that is less than one-tenth of the modulus of elasticity of the first substrate 210. In some embodiments, the compliant layer 202 has a modulus of elasticity that is less than one-twentieth of the modulus of elasticity of the first substrate 210.

In some embodiments, the compliant layer 202 may be made from a compliant adhesive. In some embodiments, the compliant adhesive may be an optically clear adhesive. For example, the compliant layer 202 may be made from an acrylic adhesive having a thickness of less than 200 microns. In some embodiments, the compliant layer 202 may be less than 100 microns. In some embodiments, the compliant layer may be about 50 microns in thickness. In other embodiments, a thinner layer of adhesive may be used. In some cases, the material used for the compliant layer 202 may have a variable modulus of elasticity. For example, the compliant layer 202 may be particularly compliant in one portion, and may be particularly non-compliant in another portion. In this manner, the compliant layer may be adapted to include a variable modulus of elasticity throughout its thickness. In one embodiment, the compliant layer 202 may be made from a number of independent layers, each having a different relative compliance. For example, a lower durometer adhesive may be layered atop a higher durometer adhesive. In some embodiments, the material of the compliant layer 202 may be selected at least in part for its modulus of elasticity. For example, in certain embodiments, a particularly low modulus of elasticity such that the compliant layer 202 is exceptionally pliant but also sufficiently resilient to maintain a gap between the layers of the stack.

In some embodiments, the material of the compliant layer 202 may be composed of layers having various thicknesses and elastic properties. The layering of material may augment the compliance of the compliant layer 202. For example, as a layering of the compliant layer 202 increases, the compliance of the layer may increase. In a like manner, the compliance of the compliant layer 202 may decrease if the material is applied thinly. In some examples, the compliant layer may be made from layers of an acrylic adhesive applied to a thickness of 15 micrometers for each layer. In some embodiments, a 15-micrometer acrylic adhesive compliant layer may have compliance that is approximately fifty-five percent of the modulus of elasticity of the same layer at 125 micrometers.

As shown in FIG. 2C, below the compliant layer 202 is a second substrate 220 having a plurality of individual force-sensitive components 222 positioned thereon. Similarly to the first substrate 210, the second substrate 220 may be made from an optically transparent material, such as polyethylene terephthalate (PET). In this example, the force-sensing components 222 may be formed as an array of rectilinear pixel elements each aligned vertically with a respective one of the array individual force-sensitive components 212. In many examples, each individual force-sensing component 222 may take a selected shape. For example, in certain embodiments, the force-sensing component 222 may include traces arranged in a serpentine pattern, similar to the serpentine pattern shown for force-sensing component 212 in FIG. 2B.

As shown in FIG. 2C, the force-sensitive components 212, 222 may be connected to sense circuitry 105 that is configured to detect changes in an electrical property of each of the force-sensitive components 212, 222. In this example, the sense circuitry 105 may be configured to detect changes in the resistance of the force-sensitive component 212, 222, which can be used to estimate a force that is applied to the device. In some cases, the sense circuitry 105 may also be configured to provide information about the location of the touch based on the relative difference in the change of resistance of a respective force-sensitive component 212.

In some embodiments, the sensing circuitry 105 may be adapted to determine a relative measurement between the electrical response of the force-sensitive component 212 and the electrical response of the force-sensitive component 222. In some cases, the electrical response that is due to the force of a touch may be different for force-sensitive components that are located on opposite sides of the compliant layer 202. For example, as described above, a force may be received at the force-receiving layer 240. Due to the rigidity of the force-receiving layer 240, a force that is received on the force-receiving layer 240 and deflects the force-receiving layer 240 may also cause the first substrate 210 to deflect. Because the force-sensitive component 212 is affixed to the first substrate 210, the force-sensitive component 212 deflects as well, and passes the force to the compliant layer 202. However, due to the compliance (e.g., elastic properties) of the compliant layer 202, the compliant layer 202 may deform and absorb at least a portion of the shear or strain in the stack caused by the force of the touch. As a result, the compliant layer 202 may cause a reduced strain in the force-sensitive component 222 disposed below the compliant layer 202. In some cases, the (lower) force-sensitive component 222 may experience a deflection and/or strain that is significantly reduced as compared to the deflection and/or strain of the force-sensitive component 212. Thus, the compliant layer 202 functions as a strain-break between the two force-sensitive components 212, 222.

Additionally the compliant layer 202 may normalize the temperature between a force-sensitive component 212 and a respective force-sensitive component 222 that is similarly positioned within the array. In particular, the compliant layer 202 may conduct heat between the force-sensitive components 212, 222 resulting in a substantially uniform temperature distribution between corresponding upper and lower components. In some implementations, the temperature of the force-sensitive component 212 and the temperature of force-sensitive component 222 may be substantially equal.

In some cases, both the thermal conductivity and mechanical compliance of the compliant layer 202 facilitates measurements that may reduce or eliminate any strain sensor drift resulting from temperature change, either locally or globally throughout the structure. In particular, measuring a relative change in the electrical response of the force-sensitive components on either side of the compliant layer 202 may be used to compensate for variations in temperature of the sensor. For example, in one embodiment, the first and second force-sensitive components 212, 222 may produce a change in resistance in response to a change in strain and/or temperature. The relative change in electrical response may be measured using a voltage divider circuit configuration. For example, the first and second force-sensitive components 212, 222 may be connected as resistive elements in a voltage divider configuration. In some cases, the force-sensitive component 212 may serve as the ground-connected resistor $R_{ground}$ of the voltage divider and the force-sensitive component 222 may serve as the supply-connected resistor $R_{supply}$ of the voltage divider. The voltage at the midpoint of the force-sensitive component 212 and force-sensitive component 222 may be calculated by multiplying the supply voltage $V_{supply}$ by the ratio of the ground-connected resistor to the total resistance (i.e., supply-connected resistor summed with the ground-connected resistor). For example, the voltage at the midpoint of the voltage divider, $V_{out}$ may be found, in a simplified example, by using the equation:

$$V_{out} = V_{supply}\left(\frac{R_{ground}}{R_{ground} + R_{supply}}\right). \qquad \text{Equation 1}$$

Due to fact that the resistance of resistive elements $R_{ground}$ and $R_{supply}$ (or force-sensitive component 212 and force-sensitive component 222, respectively) changes in response to force and in response to temperature, the resistance of either element may be calculated as a function of both force (i.e., strain) and as a function of temperature, using as a simplified example, the equation:

$$R_{measured} \approx R_{baseline}(1+a\cdot(T_{actual}-T_{baseline})(1+g\cdot\epsilon_{applied}), \qquad \text{Equation 2}$$

where $R_{baseline}$ is a baseline reference resistance, $\alpha$ is the temperature coefficient of resistance, g is the strain coefficient of resistance, and $\epsilon_{applied}$ is the strain applied to the structure. The approximation described by Equation 2 illustrates that the base resistance $R_{baseline}$ of either $R_{ground}$ and $R_{supply}$ may be altered by both the temperature and the strain applied to the material. In some cases, the effects of temperature variation may be approximated by the product of the temperature coefficient of resistance α of the material selected for the force-sensitive component, and the actual temperature $T_{actual}$ of the element. Similarly, the effect of strain may be approximated by the product of the strain coefficient of resistance g and the strain applied $\epsilon_{applied}$ to the element.

By combining Equation 2 and Equation 1 and entering the known quantities $V_{supply}$, $R_{baseline}$, α, and g and measured quantities $V_{out}$, the strain applied to each element $\epsilon 212$ and $\epsilon 222$ and the actual temperature of each element $T_{212}$ and $T_{222}$ are the only remaining unknown variables, which may be further simplified as a difference in strain Δε between the force-sensitive components 212, 222 and a difference in temperature ΔT between the force-sensitive components 212, 222.

In some implementations, the thermal conductivity of the compliant layer 240 results in a substantially uniform temperature between opposing force-sensitive components 212, 222. Thus, in some cases, the difference in temperature ΔT may be functionally approximated as zero. Additionally, because the compliance of the compliant layer 240 substantially reduces the strain experienced by the force-sensitive component 222, the strain $\epsilon_{222}$ may, in some cases, be functionally approximated as zero. In this manner, the only remaining unknown is the strain $\epsilon_{212}$ as experienced by the force-sensitive component 212. Accordingly, $\epsilon_{212}$ may be computed using an algorithm or circuitry corresponds to the relationships discussed above, which may be used to compute a force measurement or estimate. As discussed previously, the force measurement or estimate may be used as a user input for the electronic device.

Figure 3A:
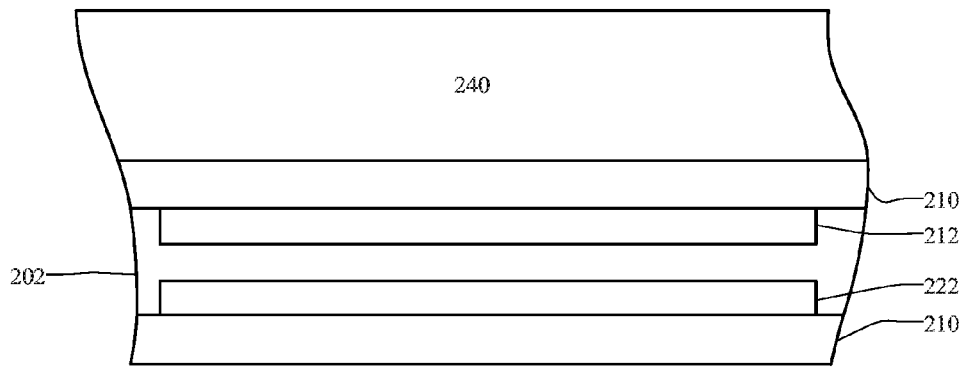
FIG. 3A depicts an enlarged detail side view of the example force-sensitive structure of FIG. 2C.
Figure 3B:
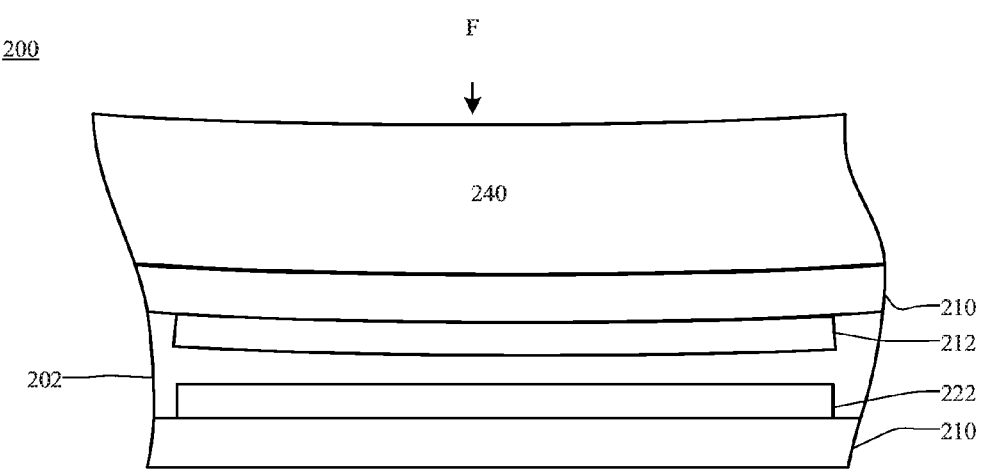
FIG. 3B depicts an enlarged detail side view of the example force-sensitive structure of FIG. 2C that has been deformed in response to an applied force.

FIG. 3A depicts an enlarged detail side view of the example force-sensitive structure of FIG. 2B. As shown in FIG. 3A, a force-sensitive component 212 is disposed along a bottom surface of the first substrate 210, which itself is adhered or otherwise affixed to a bottom surface of a force-receiving layer 240. Opposite to the first force-sensitive component 212 is a second force-sensitive component 222, adhered to a second substrate 210. Positioned between the force-sensitive components 212, 212 is a compliant layer 202. When a force F is received, the force-receiving layer 240, the first substrate 210 and the force-sensing component 212 may at least partially deflect, as shown for example in FIG. 3B. As a result of the compliance of the compliant layer 202, the force-sensing component 222 may not deflect in response to the force F. In some cases, due to the compliance of the compliant layer 202, the force-sensing component 222 may deflect, but to a degree that is less than the force-sensing component 212.

In some embodiments, the deflection of the force-sensing component 222 is approximately the same as the defection of the force-sensing component 212. However, due to the presence of the compliant layer 202, a portion of the strain and/or shear forces caused by the force F and experienced by the force-sensing component 212 may not be transferred to the lower force-sensing component 222.

Figure 4:
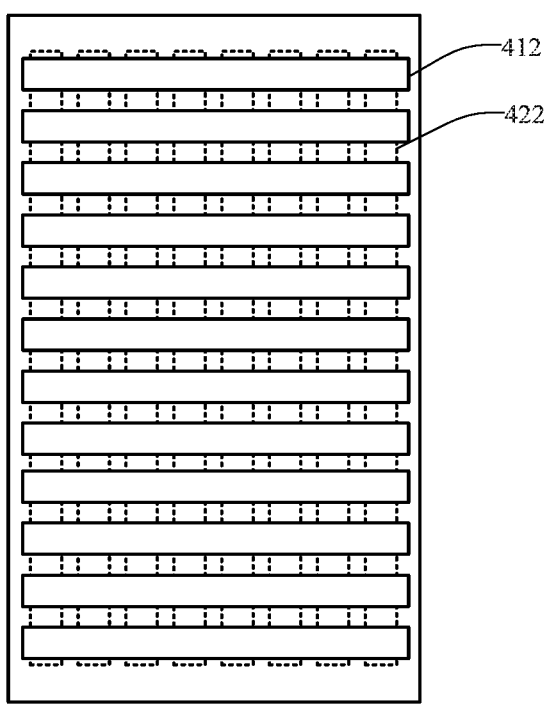
FIG. 4 depicts a top view of an alternate example of a force-sensitive structure including two perpendicular layers each including multiple optically transparent force-sensitive components.

FIG. 4 depicts a top view of an alternate example of a force-sensitive structure 400 including two layers having elements that are transverse to each other. As shown in FIG. 4, each layer includes multiple optically transparent force-sensitive components 412, 422 arranged in a linear array or pattern. One of the layers may be arranged as a number of rows while the other is arranged as a number of columns. As noted with respect to FIG. 2A, other suitable configurations of transparent force-sensitive components are contemplated. For example, the angle between the force-sensitive components 412, 422 may be substantially perpendicular, as shown in FIG. 4. Some embodiments, the angle may be different or the force-sensitive components 412, 422 may be substantially aligned.

Figure 5A:
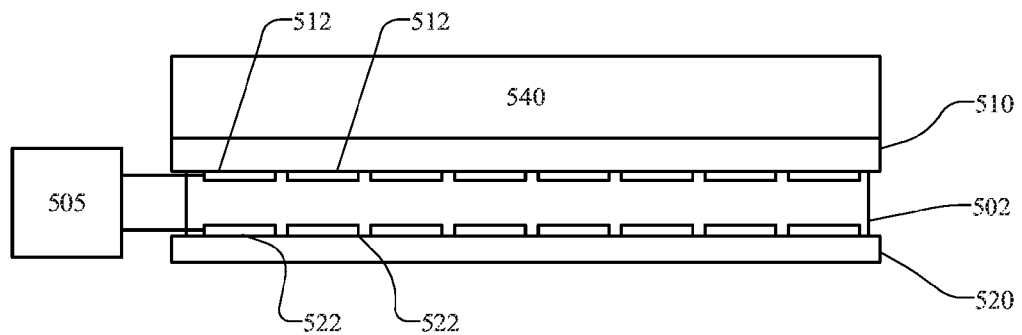
FIG. 5A depicts a side view of a portion of an alternative example force-sensitive structure of a device taken along section A-A of FIG. 1.

FIG. 5A depicts a side view of a portion of an additional example embodiment of a force-sensitive structure of a device taken along section A-A of FIG. 1. As depicted in this cross section, a first substrate 510 may be disposed below a force-receiving layer 540. The force-receiving layer 540 may correspond to the cover 106 depicted in FIG. 1 or may be disposed below the cover 106 of FIG. 1. As shown in FIG. 5A, the first substrate 510 includes a plurality of individual force-sensitive components 512. The individual force-sensitive components 512 may be made from a piezoresistive or other strain-sensitive material. By way of example, the force-sensitive components 512 may be made of silicon, germanium, or indium tin oxide.

The force-receiving layer 540 may be formed from a material such as glass, polycarbonate, or a similar transparent substrate. In some embodiments, the force-receiving layer 540 may be incorporated as a layer within a display stack. In some cases, the force-receiving layer 540 is the cover (glass) of a display stack. The force-receiving layer 540 may be made from a material having high strain transmission properties. As one example, the force-receiving layer 540 may be made from a hard or otherwise rigid material, such as glass or plastic, such that an exerted force may be effectively transmitted through the force-receiving layer 540 to the layers disposed below. The force-receiving layer 540 may also be configured to deflect in response to a force applied to the force-receiving layer 540.

Below the force-receiving layer 540, the first substrate 510, and the plurality of individual force-sensitive components 512, is a compliant layer 502. The compliant layer 502 may be made from any number of suitably compliant materials. For example, in some embodiments a low durometer elastomer may be used (in one example, the elastomer may have a durometer less than 25 Shore). In some examples, the compliant layer may be made from a low-modulus optically clear adhesive, a liquid optically clear adhesive, a silicone material, a resin material, or a gel material. In some embodiments, the compliant layer 502 may be formed to a thickness that is adapted to absorb a particular range of forces applied to a force-receiving layer. In some embodiments, the thickness of the compliant layer 502 may also depend on one or more considerations including, for example, elasticity, thermal conductivity, electrical conductivity, electrical insulation, or other electrical, thermal, or mechanical properties.

Below the compliant layer 502 and piezoresistive force-sensitive components 512, a plurality of individual force-sensitive components 522 may be positioned on a second substrate 520. The individual force-sensitive components 522 may be made from a strain-sensitive material. In such an embodiment, the force-sensitive components 512 of the first substrate 510 may be made from a different material from the force-sensitive components 522 of the second substrate.

The force-sensitive components 512, 522 may be operatively connected to sense circuitry 505 that is configured to detect changes in an electrical property or electrical response of each of the force-sensitive components 512, 522. In some embodiments, the sense circuitry 505 may be adapted to detect changes in the resistance of the force-sensitive component 515, 522 by, for example, a voltage divider (i.e., half bridge).

In some embodiments, a piezoresistive element of force-sensitive components 512, 522 may be subject to pyroelectric effects as the temperature of the sensor, device, or environment change. Accordingly, the electrical properties of the force-sensitive components 512, 522 (e.g., resistance) may change with variations in temperature. In some examples, the electrical properties or electrical response of force-sensitive components 512, 522 that vary with temperature may also be impacted by the coefficient of thermal expansion ("CTE"). Thus, in some cases, the electrical properties of the force-sensitive components 512, 522 may be modeled as the sum of the pyroelectric effect, the CTE effect, and the effect of any strain as a result of a force applied by a user. In some embodiments, the electrical properties or electrical response of the force-sensitive components 512, 522 may change with temperature as well as in response to the force of a touch. For example, electrical properties or response of the force-sensitive components 512, 522 may change due to variations in the physical dimensions of the force-sensitive components 512, 522 caused by variations in temperature (e.g., the force-sensitive components 512, 522 expanding or contracting due to thermal expansion). Additionally, the electrical properties or response of the force-sensitive components 512, 522 may change due to variations in temperature due to a pyroelectricity or a pyroelectric effect. Thus, the strain measured directly from the force-sensitive components 512, 522 may be approximated, in one example, as a sum of three components.

$$\epsilon_{measured} \approx \epsilon_{user} + \epsilon_{pyro} \epsilon_{CTE}, \quad \text{Equation 3}$$

where $\epsilon_{measured}$ is the strain measurement or estimation, $\epsilon_{user}$ is the strain due to the force of the touch, $\epsilon_{pyro}$ is the strain due to the pyroelectric effect, and $\epsilon_{CTE}$ is the strain due to the coefficient of thermal expansion. In some cases, a measurement or estimation of the force applied by the user reduces, cancels, eliminates, or otherwise compensates for the pyroelectric effect and/or the CTE effect.

Similarly, in some embodiments, the strain-sensitive material of the force-sensitive components 522 may be subject to the changes in resistance due to the changes in temperature. Such changes may be referred to as changes resulting from the thermal coefficient of resistance ("TCR") of the material selected for force-sensitive components 522. Similarly, CTE may cause the force-sensitive components 522 to physically expand or contract in response to temperature, and the effect of any strain as a result of a force applied by the user. In this manner, the resistance of the force-sensitive components 522 may directly change with temperature, the physical dimensions of the force-sensitive components 522 (and thus the resistance) may change with temperature (e.g., the force-sensitive components 522 expanding or contracting), and the dimensions of the force-sensitive components 522 may change in response to forces applied by a user. Thus, the strain measured as a function of resistance of the force-sensitive components 512 may be approximated, in one example, as a sum of three components.

$$\epsilon_{measured} \approx \epsilon_{user} + \epsilon_{TCR} \epsilon_{CTE} \quad \text{Equation 4}$$

where $\epsilon_{measured}$ is the strain measurement or estimation, $\epsilon_{user}$ is the strain due to the force of the touch, $\epsilon_{TCR}$ is the strain due to the coefficient of thermal resistance, and $\epsilon_{CTE}$ is the strain due to the coefficient of thermal expansion. In some cases, a measurement or estimation of the force applied by the user reduces, cancels, eliminates, or otherwise compensates for the TCR effect and/or the CTE effect.

In some embodiments, either or both the TCR effect and the pyroelectric effect may be several orders of magnitude larger than any strain changes as a result of a user force. However, despite the differences in scale, because the properties of both materials are known, force applied can be calculated, as temperature and force applied are the only unknown variables (using, e.g., equations 1 and 2). That is, variations in temperature may effect both sets of force-sensitive components 512, 522 to a substantially similar degree, while the strain experienced due to the force of a touch may vary due to the compliant layer 512, which may be computed or estimated using equations 1 and 2 discussed above. Thus, a measurement or estimation of the force of a touch may reduce, cancel, eliminate, or otherwise compensate for various temperature effects, including, for example, the pyroelectric effect, the TCR effect, and/or the CTE effect.

Figure 5B:
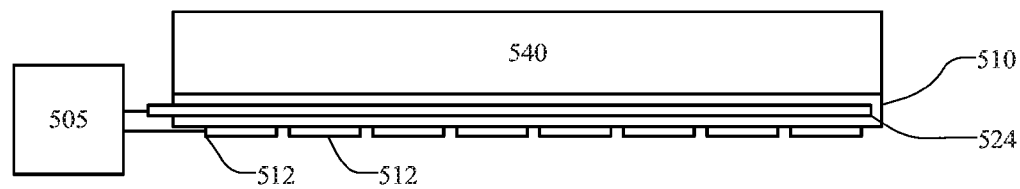
FIG. 5B depicts a side view of a portion of an alternative example force-sensitive structure of a device taken along section A-A of FIG. 1.

FIG. 5B depicts a side view of a portion of an example embodiment of a force-sensitive structure of a device taken along section A-A of FIG. 1. As with FIG. 5A, a plurality of force-sensitive components 512 may be disposed below a substrate 510 which may receive a force from a force-receiving layer 540. The sense circuitry 505 may be adapted to measure a change in an electrical property of the force-sensitive components 512 in accordance with the previous discussion. The sense circuitry 505 may also be coupled to a temperature sensor 524. The temperature sensor 524 may be thermally coupled to the force-sensitive components 512. For example in one embodiment, the temperature sensor 524 may be included within the substrate 510. In another example, the temperature sensor may be included below the force-sensitive components 512, or elsewhere within the stack. The temperature measurement provided by the temperature sensor 524 may be used to calculate a compensation factor that may be applied to the strain measurement of the force-sensitive components 512. In this manner, effects of temperature may be compensated and the temperature-individual strain as a result of a user input may be accurately measured.

In some embodiments, the force-sensitive components 512 may also serve as portions of a capacitive touch screen. For example, in a first mode the force-sensitive components 512 may be operated to measure force applied to the force-receiving layer. However, in a second mode the force-sensitive components 512 may operate as a capacitive sensor adapted to detect a user touch on the screen. Although illustrated such that the force-sensitive components 512 are oriented facing away from the bottom surface of the force-receiving layer 540, one may appreciate that alternate embodiments are contemplated. For example, in one embodiment, the force-sensitive components 512 may be oriented facing the bottom surface of the force-receiving layer 540.

Figure 5C:
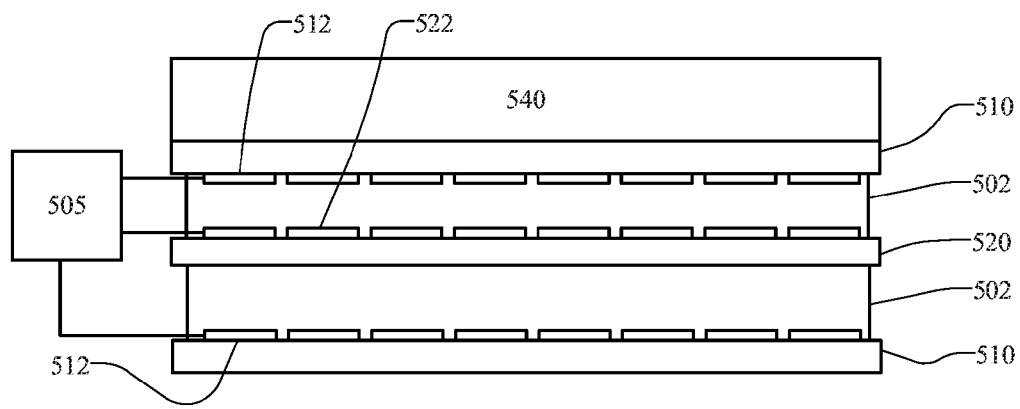
FIG. 5C depicts a side view of a portion of an alternative example force-sensitive structure of a device taken along section A-A of FIG. 1.

FIG. 5C depicts a side view of a portion of an example embodiment of a force-sensitive structure of a device taken along section A-A of FIG. 1. As with FIG. 5A, a plurality of force-sensitive components 512 may be disposed below a first substrate 510, which may receive a force from a force-receiving layer 540. Therebelow may be a first intermediate layer 502 which is positioned above a second substrate 520 which itself may include a plurality of force-sensitive components 522 disposed thereupon. Positioned below the second substrate may be a second intermediate layer 502. Below the second compliant layer 502 may be disposed a third substrate 530. The third substrate 530 may include a plurality of force-sensitive components 532. Although three layers of substrates are shown, certain embodiments may include additional layers. In many embodiments one or more of the intermediate layers 502 may be made from a compliant material.

For embodiments having this configuration or related layer configurations, temperature may be compensated by determining the temperature gradient between the first, second and third layers. For example, when a user applies a force, a strain may be measured at each of the three layers. As explained above, the measured strain may include unwanted effects of temperature. Accordingly, by measuring the difference between the measured strains of the first, second, and third layers, temperature may be derived and compensated for.

Figure 5D:
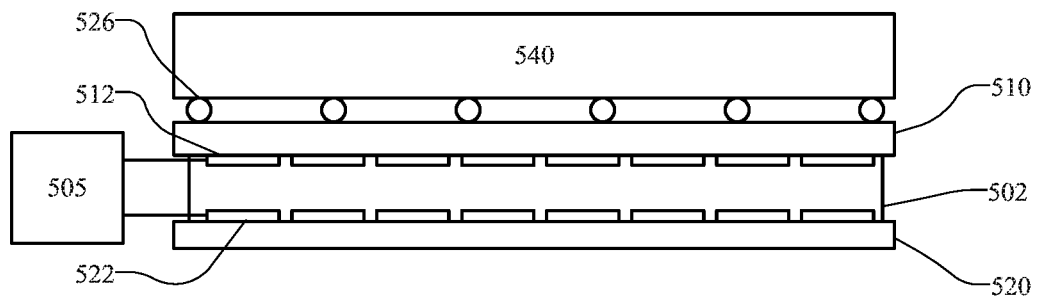
FIG. 5D depicts a side view of a portion of an alternative example force-sensitive structure of a device taken along section A-A of FIG. 1.

FIG. 5D depicts a side view of a portion of an example embodiment of a force-sensitive structure of a device taken along section A-A of FIG. 1. As with FIG. 5A, a plurality of force-sensitive components 512 may be disposed below a first substrate 510 which may receive a force from a force-receiving layer 540 through a thermal break layer 526. The thermal break layer 526 may be adapted to translate mechanical force downward from the force-receiving layer 540 to the first substrate 510 without transferring heat. As shown, the thermal break layer may create an air gap between the bottom surface of the force-receiving layer 540 and the first substrate 510. In this manner, the temperature of the first and second substrates 510, 520 and the respective layers of force-sensitive components 512, 522 may be at least partially isolated from environmental conditions, which may improve the accuracy and performance of the force sensor.

Figure 5E:
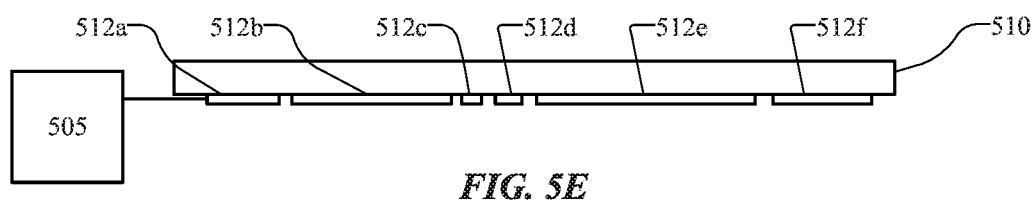
FIG. 5E depicts a side view of a portion of an alternative example force-sensitive structure of a device taken along section A-A of FIG. 1.

FIG. 5E depicts a side view of a portion of an example embodiment of a force-sensitive structure of a device taken along section A-A of FIG. 1. In such an embodiment, a single strain sensing layer including a number of strain sensors 512 that exhibits different strain and or thermal properties at different locations about the substrate 510. For example, strain sensor 512a may have a different geometry than strain sensor 512b. The difference in geometry may be selected for any number of reasons. For example, a larger strain sensor geometry may be necessary for portions of the substrate 510 which are expected to experience greater deformation than other portions of the substrate.

In one example, different geometries for different strain sensors may be selected based upon what electronic components may be disposed below the force-sensitive structure when the structure is included within an electronic device. In other cases, different geometries may be present for different expected force input areas. For example, certain embodiments may include a force-sensing area that is designed to be more sensitive than a second force-sensing area. Accordingly, the geometry of strain sensors included within these two areas may differ. In this manner, different regions of a substrate 510 may include different strain sensors 512. Strain sensors may differ in geometry, orientation, material, or other properties.

Figure 5F:
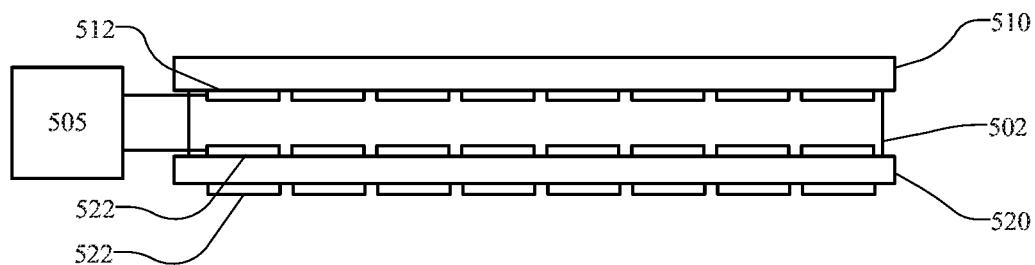
FIG. 5F depicts a side view of a portion of an alternative example force-sensitive structure of a device taken along section A-A of FIG. 1.

FIG. 5F depicts a side view of a portion of an example embodiment of a force-sensitive structure of a device taken along section A-A of FIG. 1. As with FIG. 5A, a plurality of force-sensitive components 512 may be disposed below a first substrate 510 which may receive a force from a force-receiving layer 540. Positioned below the first substrate 510 may be a compliant layer 502 below which a second substrate 520 may be positioned. Along a top surface of the second substrate 520 may be a first plurality of force-sensitive components 522, similar to the embodiment as shown in FIG. 2C. Positioned along a bottom surface of the second substrate 520 may be a second plurality of force-sensitive components 522. In such an embodiment, the force-sensitive components 512 may be measured in conjunction with the first plurality of force-sensitive components 522, in the manner as substantially described with respect to FIG. 2C. For example, measurement may be accomplished in certain embodiments by a half bridge.

Thereafter or therewith, the difference between the first plurality of force-sensitive components 522 may be measured against the second plurality of force-sensitive components 522. These, for example, may be measured using a half bridge, or alternately with a quarter bridge (i.e., measuring the second plurality of force-sensitive components 522 independent of the first plurality). In this manner, effects of temperature may be compensated and strain resultant from a user force input may be measured.

Figure 5G:
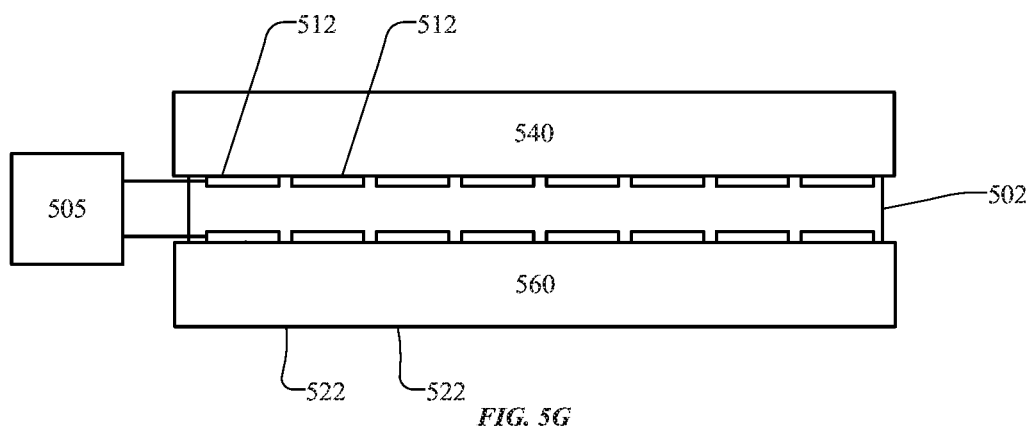
FIG. 5G depicts a side view of a portion of an alternative example force-sensitive structure of a device taken along section A-A of FIG. 1.

FIG. 5G depicts a side view of a portion of an example of a force-sensitive structure of a device taken along section A-A of FIG. 1. As with FIG. 5A, a plurality of force-sensitive components 512 may be disposed below a force-receiving layer 540. In such an embodiment the force-receiving layer may be a cover (e.g., cover glass) associated with a display stack of a portable electronic device. Positioned below the cover may be a compliant layer 502 below which a substrate 520 may be positioned. In such an embodiment, the compliant layer 502 may be a liquid crystal layer associated with the display stack. Positioned along the substrate 520 may be a plurality of force-sensitive components. In such an embodiment, the substrate may be a thin film transistor layer associated with the display stack. In this manner, a force-sensitive structure may be directly incorporated within a display stack for a portable electronic device.

Figure 5H:
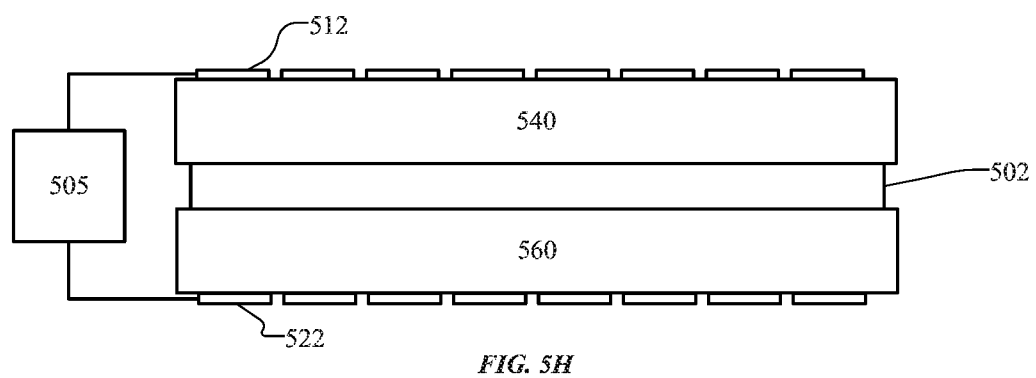
FIG. 5H depicts a side view of a portion of an alternative example force-sensitive structure of a device taken along section A-A of FIG. 1.

FIG. 5H depicts a side view of a portion of an example embodiment of a force-sensitive structure of a device taken along section A-A of FIG. 1. related to FIG. 5G, a plurality of force-sensitive components 512 may be disposed above a force-receiving layer 540 that may be the cover glass associated with a display stack. Positioned below the first substrate 510 may be a compliant layer 502, which may be a liquid crystal layer associated with the display stack. Positioned below the compliant layer 502 may be a substrate 520 which may be a thin film transistor layer associated with the display stack. Along a bottom surface of the thin film transistor layer may be a plurality of force-sensitive components 512. In this manner, a force-sensitive structure may be directly incorporated within a display stack for a portable electronic device.

Figure 5I:
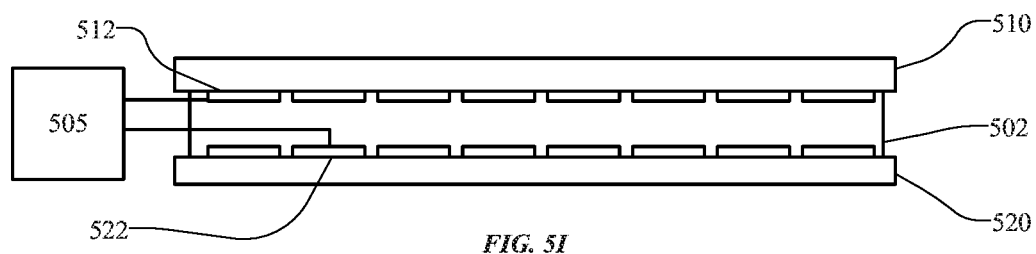
FIG. 5I depicts a side view of a portion of an alternative example force-sensitive structure of a device taken along section A-A of FIG. 1.

FIG. 5I depicts a side view of a portion of an example embodiment of a force-sensitive structure of a device taken along section A-A of FIG. 1. In such an embodiment, the sensing circuitry 505 may measure differences between a force-sensitive component 512 and a force-sensitive component 522 that are not vertically aligned. In this manner, the sensing circuitry may progressively scan a single force-sensitive component 512 against a number of force-sensitive components 522.

Figure 6A:
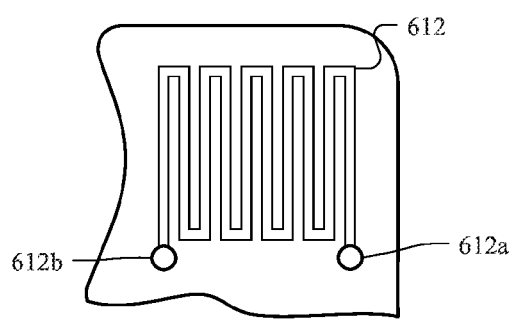
FIGS. 6A-D depicts a top detailed view of an optically transparent serpentine force-sensitive component having various serpentine patterns and which may be used in the example force-sensitive structure depicted in FIG. 2A.
Figure 6B:
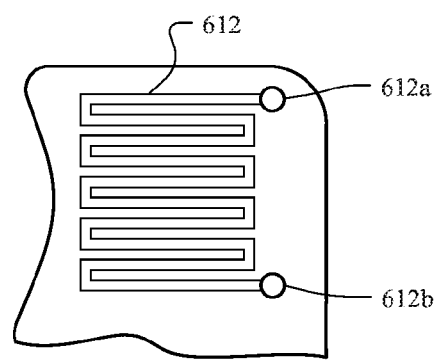
Figure 6C:
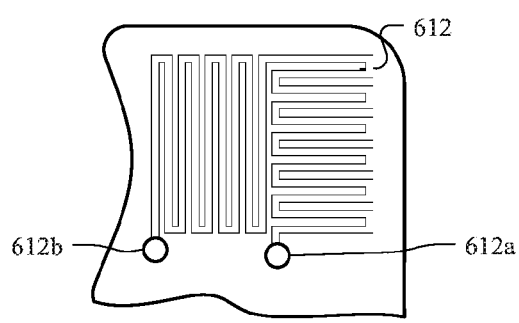

FIGS. 6A-6C depict a top detailed view of various optically transparent serpentine geometries for a force-sensitive component which may be used in the example force-sensitive structure depicted in FIG. 2A. For example, the force-sensing component 612 may include at least two electrodes 612a, 612b for connecting to a sensing circuit or, in other cases, the force-sensing component 212 may be electrically connected to sense circuitry without the use of electrodes. For example, the force-sensing component 212 may be connected to the sense circuitry using conductive traces that are formed as part of the component layer.

FIG. 6A depicts a top view of a serpentine geometry which is sensitive to strain along the Y-axis. In this manner, when the force-sensing component 612 is strained in the X-axis direction, the force-sensing component 612 may not experience substantial tension. Conversely, when the force-sensing component 612 is strained in the Y-axis direction, a strain may be detected and measured. One may appreciate that angular strain (e.g., strain along a 45 degree path) may strain the force-sensing component 612 in an amount proportional of equal to the vector component of the strain along the Y-axis. Similarly, FIG. 6B depicts a top view of a serpentine geometry which is sensitive to strain along the X-axis, and may not be particularly sensitive to strain along the Y-axis. FIG. 6C depicts a top view of a serpentine geometry which may be sensitive to strain along the X-axis and Y-axis.

Figure 6D:
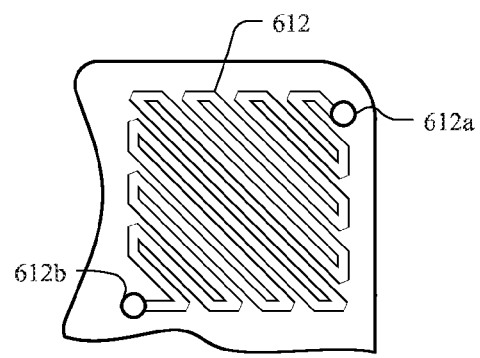

FIG. 6D depicts a top view of a serpentine geometry which may be sensitive to strain along a 45 degree angle. One may appreciate that although shown at 45 degrees, any angle or combination of angles may be employed. For example, one embodiment may include angling a strain sensor 612 along an 80 degree angle. Another embodiment may include a strain sensor having multiple distinct portions similar to FIG. 6C, in which one portion is angled at 45 degrees and another portion is angled at 75 degrees. In many embodiments, the angle or combination of angles of orientation for different force-sensitive components may be selected, at least in part based on the location of the particular force-sensitive component along the surface of an electronic device.

Figure 7:
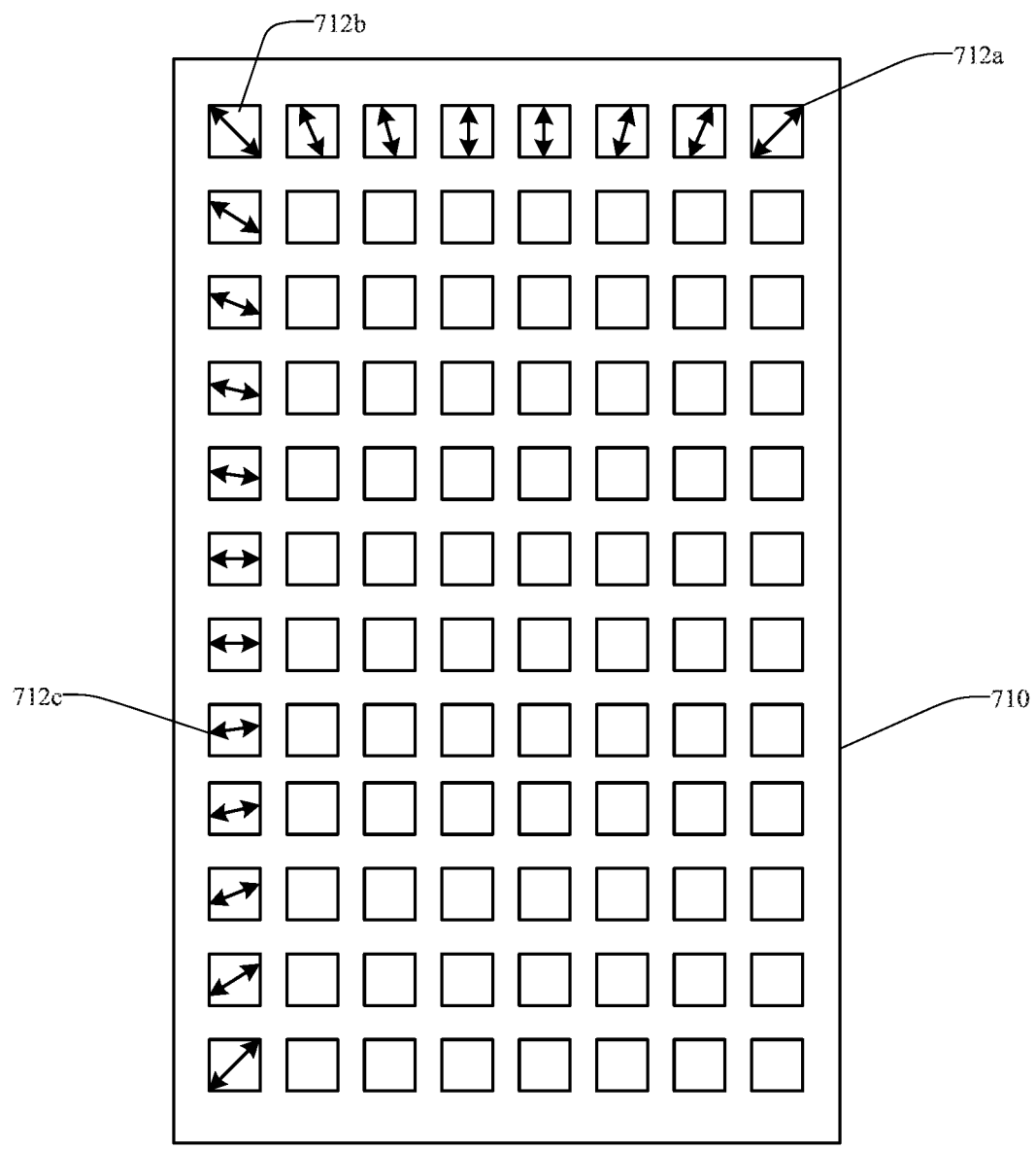
FIG. 7 depicts a top view of an example force-sensitive structure including a grid of optically transparent force-sensitive components oriented in different directions to detect force.

For example, FIG. 7 depicts a top view of an example force-sensitive structure including a grid of optically transparent force-sensitive components 712 having traces that are oriented in a variety of directions to detect strain along respective directions. For example, force-sensitive component 712a may have traces that are oriented to detect strain along a 45 degree angle, whereas force-sensitive component 712b may have traces that are oriented to detect strain along a 45 degree angle. In another example, force-sensitive component 712c may be adapted to detect along an arbitrary angle between 0 and 45 degrees.

In certain embodiments, the orientation of the sensing elements or traces of the force-sensitive components may correspond to the position of the force-sensitive component relative to the enclosure of an electronic device. The orientation of the strain sensitivity may be configured to correspond, for example, with the predicted strain due to the boundary conditions or constraints of the force sensor. For example, a force-sensitive component positioned proximate to the edge of a screen within a display stack may be oriented differently from a force-sensitive component positioned in the center of the display. In some embodiments, as shown in FIG. 7, the orientation of the force-sensitive components are approximately perpendicular to an edge of the force sensor.

In some embodiments, as shown in FIG. 7, the grid may be formed from an array of components that includes a subset of edge force-sensitive components 712c positioned along an edge of the first array. In some cases, the edge force-sensitive components 712c are formed from traces that are oriented along a direction that is substantially perpendicular to the edge. As shown in FIG. 7, the array of force-sensitive components may include a subset of corner force-sensitive components 712a, 712b positioned at corners of the array or grid. In some cases, the corner force-sensitive components 712a, 712b are formed from traces that are oriented along a diagonal direction.

Figure 8:
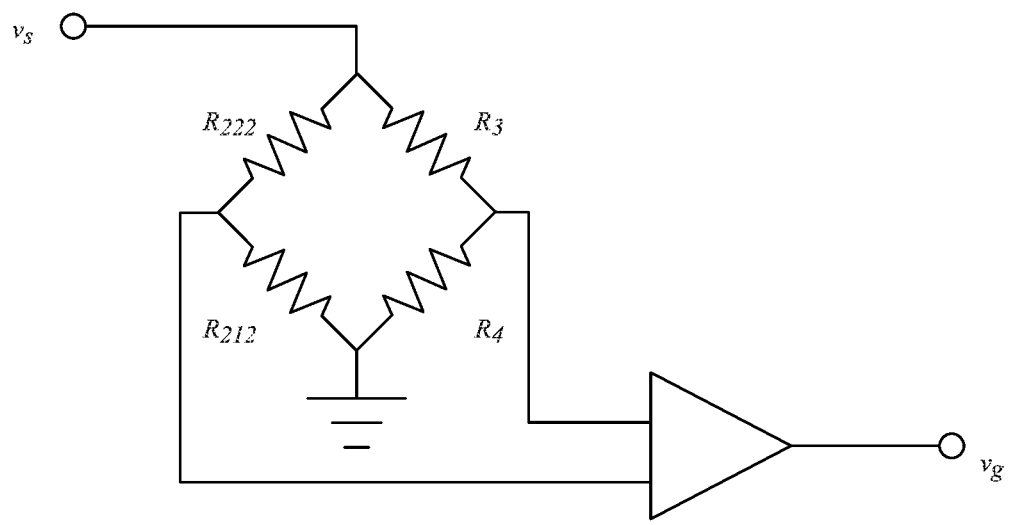
FIG. 8 depicts a simplified signal flow diagram of a temperature-compensating and optically transparent force sensor circuit.

FIG. 8 depicts a simplified signal flow diagram of a temperature-compensating and optically transparent force sensor in the form of a Wheatstone bridge. In some embodiments, a voltage Vg may be measured across the output of two parallel voltage dividers connected to a voltage supply Vs. One of the voltage dividers may include two resistors of known resistance $R_3$, $R_4$ and the other voltage divider may include two variable resistors that, in this example, represent the force and temperature variable resistance of the force-sensitive components 212, 222 as shown, for example in FIGS. 2A-3. Using, for example, Equation 2 into Equation 1 described above, and entering the known quantities $V_{supply}$ (Vs.), $R_{baseline}$, $\alpha$, g, $R_3$, and, $R_4$ and measured quantity $V_{out}$ (Vg.), the strain $\epsilon_{212}$ applied to the force-sensitive element 212 becomes the only remaining unknown. Accordingly, the strain due to the force of the touch may be calculated or estimated and used to estimate the force on the surface of the device.

Figure 9:
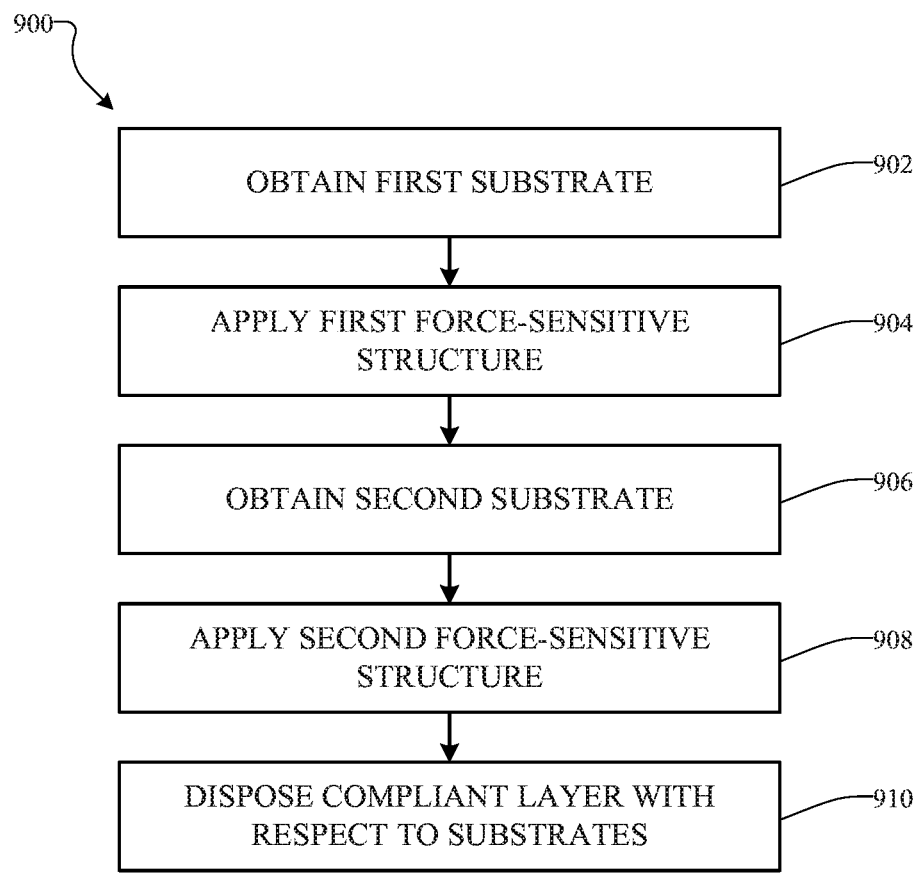
FIG. 9 is a process flow diagram illustrating example steps of a method of manufacturing a temperature-compensating and optically transparent force sensor.

FIG. 9 is a process flow diagram depicting example operations of a process 900 for manufacturing a temperature-compensating and optically transparent force sensor. Process 900 may be used to construct or manufacture one or more of the sensor embodiments described above with respect to FIGS. 2-5. In particular, process 900 may be used to construct a force sensor having a compliant layer, which may be used to measure the force of a touch and compensate for variations in temperature.

In operation 902, a first substrate may be selected or obtained. As discussed previously, a substrate may be formed from an optically transparent and substantially rigid material. Consistent with embodiments described herein, the substrate is rigid in that it is non-compressible when a force is applied. However, the substrate is flexible and is configured to deflect or bend in response to a force applied to a surface of the device in which the force sensor is installed or otherwise integrated within. Potential substrate materials include, for example, glass or transparent polymers like polyethylene terephthalate (PET) or cyclo-olefin polymer (COP).

In operation 904, a transparent force-sensitive structure is applied to a surface of the first substrate. In some embodiments, the transparent force-sensitive structure is a peizoresistive or strain-sensitive material that is deposited, formed on, attached, or otherwise fixed relative to a surface of the first substrate. In some cases, the force-sensitive structure is formed from a transparent conductive material. Example transparent conductive materials include polyethyleneioxythiophene (PEDOT), indium tin oxide (ITO), carbon nanotubes, graphene, piezoresistive semiconductor materials, and piezoresistive metal materials, silver nanowire, other metallic nanowires, and the like. The transparent force-sensitive structures may be applied as a sheet or may be patterned into an array on the surface of the first substrate In operation 906, a second substrate is selected or obtained. The second substrate may be substantially similar to the substrate selected or obtained with respect to operation 902, described above. In some embodiments, the second substrate may be less flexible than the first substrate. In particular, in some embodiments, it is not necessary that the second substrate bend or deflect in response to the force of a touch on the device.

In operation 908, a transparent force-sensitive structure is applied to a surface of the second substrate. Operation 908 is substantially similar to operation 904. In some embodiments, the transparent force-sensitive structures are disposed on a surface of the second substrate that faces the first substrate when the layers are combined or assembled into the final sensor configuration.

In operation 910, a compliant layer is disposed between the first and second substrates. In some embodiments, the compliant layer is formed from one or more layers of optically clear adhesive. For example, multiple layers of optically clear adhesive film may be stacked or laminated together to form the compliant layer. In some embodiments, the compliant layer is in liquid or gel form and may be injected or otherwise disposed between the first and second substrate. In some embodiments, operation 910 includes a curing process in which the compliant layer is subjected to a curing agent and/or is allowed to cure over time.

Figure 10:
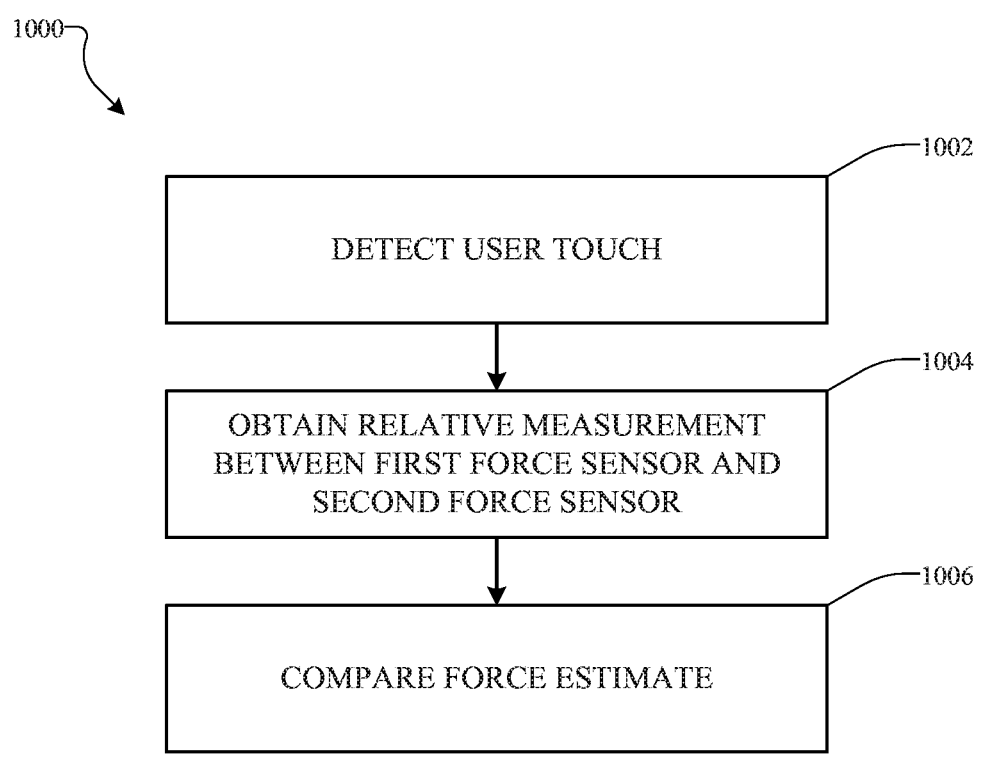
FIG. 10 is a process flow diagram illustrating example steps of a method of operating a temperature-compensating force sensor.

FIG. 10 is a process flow diagram depicting example operations for a process 1000 of operating a temperature-compensating force sensor. Process 1000 may be used, for example, to operate one or more of the force sensors described with respect to FIGS. 2-5, above. In particular, process 1000 may be used to compute or estimate the force of a touch on a device and compensate for variations or effects of temperature.

In operation 1002, an occurrence of a user touch may be detected. The touch may be detected, for example using a touch sensor. The touch sensor may include, for example, a self-capacitive, mutually capacitive, resistive, or other type of touch sensor. In some embodiments, the occurrence of a touch may be detected by the force sensor. For example, a change in strain or resistance or strain of one or more force-sensitive structures of the sensor may be used to detect the occurrence of a touch. In some embodiments, operation 1002 is not necessary. For example, the other operations of process 1000 may be performed on a regularly repeating or irregular interval without first determining if a touch is present. For example, process 1000 may be performed and calculate or estimate a zero applied force, which may be due to the absence or lack of a touch on the device.

In operation 1004, a relative measurement between two or more force-sensitive structure may be obtained. As described previously with respect to, for example, FIGS. 2A-C, 3A-B, and 5A-I, and 8 a relative measurement may be obtained using a voltage divider, half bridge, full bridge, or other similar circuit configuration. In some embodiments, an electrical measurement of each individual force-sensitive structure is obtained and the measurements are compared using software, firmware, or combination of software/firmware and circuit hardware.

In operation 1006, a force estimate may be computed. In some embodiments, the force estimate compensates for variations in thermal effects, including, for example a pyroelectric effect, TCR effect, and/or CTE effect, as described above with respect to Equations 3 and 4. In particular, the relative measurement obtained in operation 1004 may be used in combination with Equations 1 and 2 to compute an estimated strain. The estimated strain may then be used to estimate an applied force using, for example, a known correlation between the strain of the corresponding force-sensitive structure and an applied force. For example, the strain may correspond to an estimated deflection of the substrate (and other relevant layers of the display/sensor stack), which may correspond to a respective force on a surface of the device.

Figure 11:
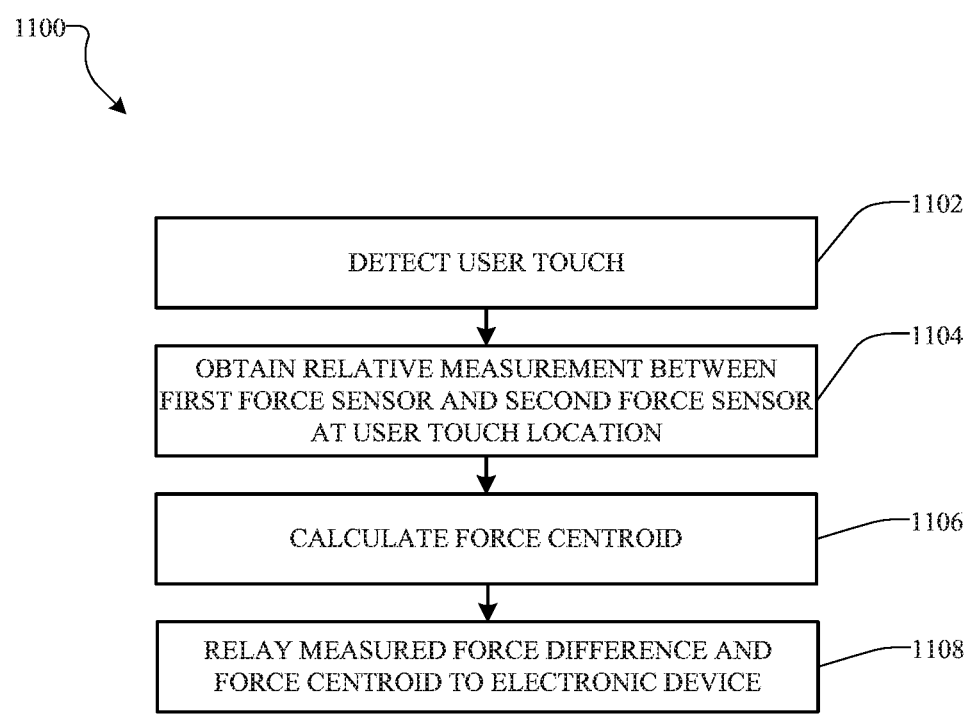
FIG. 11 is an additional process flow diagram illustrating example steps of a method of operating a temperature-compensating force sensor.

FIG. 11 is an additional process flow diagram illustrating example steps of a process 1100 for operating a temperature-compensating force sensor. In operation 1102, a location of a user touch may be identified. The location of a user touch may be determined, using for example a self-capacitive touch sensor, a mutually capacitive touch sensor, a resistive touch sensor, and the like.

In operation 1104 a relative measurement between two or more force-sensitive structure may be obtained. As described previously with respect to, for example, FIGS. 2A-C, 3A-B, and 5A-I, and 8 a relative measurement may be obtained using a voltage divider, half bridge, full bridge, or other similar circuit configuration. In some embodiments, an electrical measurement of each individual force-sensitive structure is obtained and the measurements are compared using software, firmware, or combination of software/firmware and circuit hardware.

In operation 1106, a force centroid is calculated. For example, the relative measurement obtained in operation 1104 may be used to approximate the centroid of the applied force at 1106. In some embodiments, the location of the user touch obtained in operation 1102 may be used to approximate the centroid of the applied force. In some embodiments, the geometric centroid of all touches of a multi-touch event may be used to approximate the centroid of the applied force. Thereafter, the measured force and the force centroid may be forwarded or otherwise relayed to the electronic device in operation 1108.

Figure 12:
FIG. 12 depicts a side view of a portion of an alternative example force-sensitive structure including a single piezo element.

FIG. 12 illustrates a sample single-layer piezo strain sensor. The piezo film 1202 may be sandwiched between upper substrate 1210 and lower substrate 1220 and joined to each such substrate by an adhesive 1206, 1208, such as an optically clear adhesive. Generally, an electric field is generated by the strain on the piezo film 1202 and is created by a combination of stresses in each of the three cardinal directions (referred to as T1, T2, and T3 in this discussion). The field $D_3$ may be represented as follows:

$$D_3 = d_{31}T_1 + d_{32}T_2 + d_{33}T_3 + p_3 \Delta T, \qquad \text{Equation 5}$$

where $\Delta T$ is a temperature sensitivity of the film, D is a measure of electronic displacement and $d_{31}$, $d_{32}$, and $d_{33}$ are piezoelectric coefficients of the film with respect to the three axes. Thus, the sensor may create a signal due to a change in temperature that is undistinguishable from a signal generated due to mechanical strain.

Figure 13:
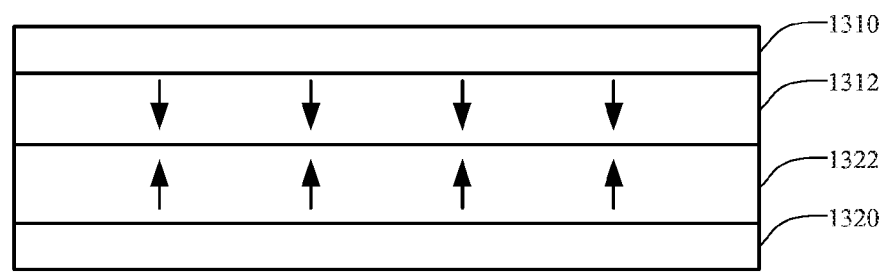
FIG. 13 depicts a side view of a portion of an alternative example force-sensitive structure including a multi-layered piezo element.

FIG. 13 illustrates a sample bimorph piezo strain sensor. Two layers of piezo film 1312, 1322 may be laminated together to create a differential strain-sensing device that may be used to reduce the effect of temperature on strain measurements, and thus on estimating a force resulting from strain measurements. The piezo films 1312, 1322, may be affixed to one another by an adhesive (not shown) such as an optically clear adhesive. Likewise, each film may be affixed to a substrate 1310, 1320 by an adhesive (also not shown). In contrast to certain embodiments described above, optically clear adhesives or other intervening layers between the piezo films are not required to be compliant. For example, the optically clear adhesive disposed between the piezo films 1312 and 1322 may be rigid or otherwise non-compliant.

The piezo film 1312 of FIG. 13 may be anisotropic. For example, the piezo films 1312, 1322 may be stretched to orient their polymer chains either uni-axially or bi-axially. When stretched, the piezoelectric effect of the film due to mechanical stress is much stronger in the direction of stretch than in the transverse direction. In some embodiments, the piezoelectric effect may be ten times greater in the direction of stretch than in the transverse direction.

By employing bi-axial and/or uni-axial anisotropic piezo films in a force-sensitive stackup, a sensor may be created that is sensitive to only one direction of strain, or, in other words, is much more sensitive to strain in one direction than to strains in other directions. Thus, anisotropic piezo films such as those shown in FIGS. 13 and 14 may be selectively stretched to be especially sensitive to strain in a selected direction.

As illustrated in FIG. 13, piezo film 1312 is anisotropic (e.g., stretched) and piezo film 1322 is isotropic (e.g., not stretched). The direction of stretch of film 1312 may be transverse to the illustrated arrows. Generally, the combination of an anisotropic piezo film 1312 and an isotropic piezo film 1322, as configured and shown in FIG. 13, generates an electronic displacement $D_3$ (which is used to measure strain) as follows:

$$D_3 = (d_{31}^A - d_{31}^B)T_1 + (d_{32}^A - d_{32}^B)T_2 + (d_{33}^A - d_{33}^B)T_3 + (p_3^A - p_3^B)\Delta T \quad \text{Equation 5}$$

Thus, the temperature-dependency of the electronic displacement is canceled out, as is the sensitivity of the electrical field to directions other than the one desired. In other words, because the electronic displacements of the films effectively reduce to zero, all effects of temperature between the films may be effectively eliminated.

Figure 14:
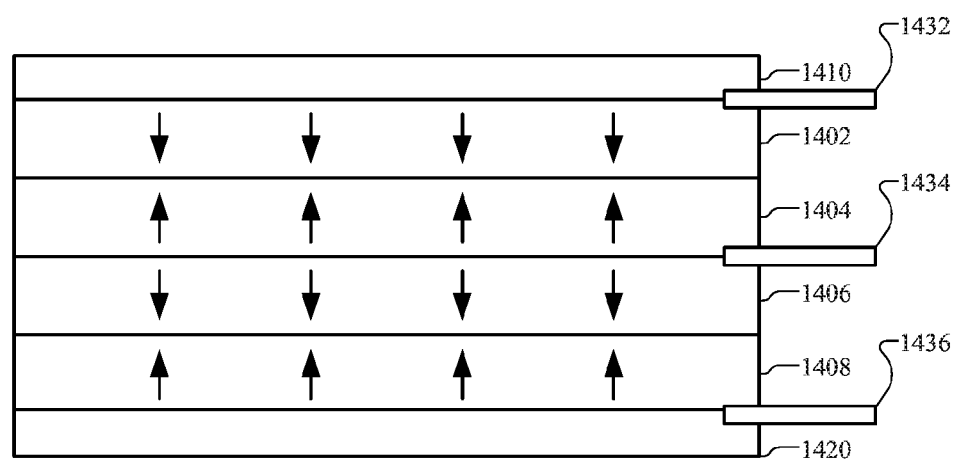
FIG. 14 depicts a side view of a portion of an alternative example force-sensitive structure including a multi-layered piezo element.

FIG. 14 depicts yet another sample temperature-independent strain sensor that may be used to estimate force in two dimensions. Here, films 1402, 1404 are identical to the piezo films 1312, 1322 shown in FIG. 13. However, film 1408 is stretched in a direction 90 degrees offset to that of film 1402, and film 1406 is isotropic.

By measuring the voltage between films 1404 and 1406 (using e.g., electrode 1434), the voltage at the joinder of film 1402 and the upper substrate 1410 (using e.g., electrode 1432), and the voltage at the joinder of film 1408 and the lower substrate 1420 (using e.g., electrode 1436), the strain applied in two directions (such as ninety degrees offset, or at other desired angles in alternative embodiments) may be determined. In this manner, force sensitivity and measurement through strain sensing may be provided along two axes. Further, the structure may provide a temperature-independent measurement of strain in both axes, as the layers compensate for the pyroelectricity of the various piezo films. As with FIG. 13, the temperature-independent measurement may be the result of the electronic displacements of the films effectively reducing to zero, thereby effectively eliminating all effects of temperature.

Figure 15:
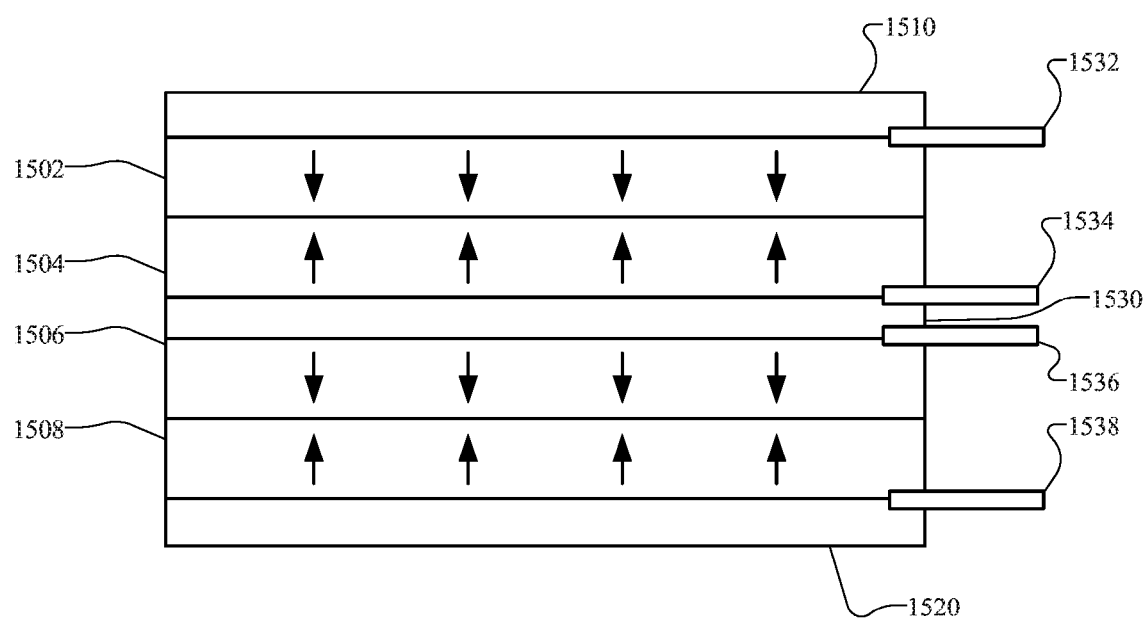
FIG. 15 depicts a side view of a portion of an alternative example force-sensitive structure including a multi-layered piezo element.

FIG. 15 depicts yet another sample temperature-independent strain sensor that may be used to estimate force in two dimensions. Here, films 1502, 1504, 1506, and 1508 may be identical to the correspondingly-identified films of FIG. 14. However, a substrate 1530 may be positioned between the stack of film 1502 and 1504 and the stack of film 1506 and 1508. As shown in FIG. 15, electrodes 1532, 1534, 1536, and 1538 may be used to measure the voltage at the joinder of respective layers. In this manner, the strain sensor may distinguish between two different directions of strain. The different directions may be used in certain embodiments for directional detection of tactile strain.

As with FIGS. 13 and 14, the temperature-independent measurement from the example sensor of FIG. 15 may be the result of the electronic displacements of the films effectively reducing to zero, thereby effectively eliminating all effects of temperature.

Similarly, additional layers may be added to embodiments such as those depicted in FIGS. 14 and 15 in order to add sensitivity to additional directions. For example, an additional layer may be adapted to be sensitive to strain forty five degrees offset from the first or second layer.

One may appreciate that although many embodiments are disclosed above with respect to optically transparent force sensors, that the systems and methods described herein may apply equally well to opaque force sensors or force sensors that are not required to be transparent. For example, the force sensors described herein may be included below a display stack, or within the enclosure of a device. For example, an electronic device may be adapted to react to a user squeezing or applying pressure to an enclosure of an electronic device. Such a force sensor need not, in all embodiments, be transparent. Still further embodiments may include a force sensor that is translucent. For example, a force sensor component may be doped with an ink such that the force sensor appears as a particular color or set of colors. In still further embodiments, the force sensor may be optionally transparent, translucent or opaque.

Embodiments described herein may be formed in any number of suitable manufacturing processes. For example, in one embodiment, a force-sensitive structure may be formed in a roll-to-roll process which may include depositing a force-sensitive material in a selected pattern on a substrate, bonding said substrate to one or more additional layers or components of an electronic device, and singulating the output of the roll-to-roll process into a plurality of individual force-sensitive structures.

One may appreciate that although many embodiments are disclosed above, that the operations and steps presented with respect to methods and techniques described herein are meant as exemplary and accordingly are not exhaustive. One may further appreciate that alternate step order or fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. An electronic device comprising:
   a touch-sensitive surface;
   a force sensor positioned below the touch-sensitive surface and comprising:
      a first strain-sensitive element;
      a compliant layer disposed below the first strain-sensitive element; and
      a second strain-sensitive element below the compliant layer and electrically coupled to the first-strain sensitive element; and
   a sensor circuit configured to obtain a differential measurement between a first strain of the first strain-sensitive element and a second strain of the second strain-sensitive element; wherein
   the differential measurement changes in response to a force applied to the touch-sensitive surface; and
   the sensor circuit compensates for a difference in temperature between the first and second strain-sensitive elements in response to the differential measurement.

2. The electronic device of claim 1, wherein the compliant layer is configured to conduct heat between the first strain-sensitive element and the second strain-sensitive element.

3. The electronic device of claim 1, wherein
the first strain-sensitive element is a member of a first array of strain-sensitive elements; and
the second strain-sensitive element is a member of a second array of strain-sensitive elements.

4. The electronic device of claim 3, wherein the first array of strain-sensitive elements is arranged as a grid.

5. The electronic device of claim 3, wherein the first array of strain-sensitive elements is arranged as a line.

6. The electronic device of claim 3, wherein the second array of strain-sensitive elements is arranged in a manner complementary to an arrangement of the first array of strain-sensitive elements.

7. The electronic device of claim 1, wherein the first strain-sensitive element is disposed on a glass substrate.

8. The electronic device of claim 1, wherein the first strain-sensitive element is formed from indium tin oxide.

9. The electronic device of claim 1, wherein the compliant layer comprises an optically clear adhesive.

10. The electronic device of claim 1, wherein at least one of the first or second strain-sensitive elements are optically transparent.

11. An electronic device comprising:
a cover defining a touch-sensitive surface;
a force sensor positioned below the cover and comprising a strain-sensitive element configured to deform in response to a force applied to the touch-sensitive surface; and
a sensor circuit configured to obtain a differential measurement between a strain response of the strain-sensitive element and an electrical response of a resistive element, the resistive element electrically coupled to the strain-sensitive element; wherein
the resistive element is formed from the same material as the strain-sensitive element; and
the resistive element is thermally coupled to the strain-sensitive element such that the electronic device is configured to reduce a difference in temperature between the resistive element and the strain-sensitive element in response to the differential measurement.

12. The electronic device of claim 11, wherein the strain-sensitive element is a member of an array of strain-sensitive elements disposed on a substrate.

13. The electronic device of claim 12, wherein the array of strain-sensitive elements is arranged in a grid on the substrate.

* * * * *